US012080442B2

(12) United States Patent
Dragomir et al.

(10) Patent No.: US 12,080,442 B2
(45) Date of Patent: Sep. 3, 2024

(54) ATOMIC COOLING AND TRAPPING METHODS AND APPARATUS

(71) Applicant: University of Southampton, Southampton (GB)

(72) Inventors: Andrei-Aurel Dragomir, Southampton (GB); Matthew David Himsworth, Southampton (GB)

(73) Assignee: UNIVERSITY OF SOUTHAMPTON, Southampton (GB)

( * ) Notice: Subject to any disclaimer, the term of this patent is extended or adjusted under 35 U.S.C. 154(b) by 0 days.

(21) Appl. No.: 18/449,142

(22) Filed: Aug. 14, 2023

(65) Prior Publication Data

US 2023/0386695 A1 Nov. 30, 2023

Related U.S. Application Data

(63) Continuation of application No. 18/248,157, filed as application No. PCT/EP2021/079961 on Oct. 28, 2021.

(30) Foreign Application Priority Data

Oct. 29, 2020 (GB) ..................................... 2017157

(51) Int. Cl.
*G21K 1/00* (2006.01)
*G21K 1/06* (2006.01)

(52) U.S. Cl.
CPC ............ *G21K 1/006* (2013.01); *G21K 1/067* (2013.01)

(58) Field of Classification Search
CPC ............................... G21K 1/006; G21K 1/067
See application file for complete search history.

(56) References Cited

U.S. PATENT DOCUMENTS

2014/0007677 A1 1/2014 Italiano et al.

FOREIGN PATENT DOCUMENTS

WO 2019092412 A1 5/2019
WO 2022090381 A1 5/2022

OTHER PUBLICATIONS

P. D. Lett, R. N. Watts, C. I. Westbrook, W. D. Phillips, P. L. Gould, and H. J. Metcalf, "Observation of Atoms Laser Cooled below the Doppler Limit", Physical review letters 61, 169 (1988).

(Continued)

*Primary Examiner* — Sean M Luck
(74) *Attorney, Agent, or Firm* — Renner, Otto, Boisselle & Sklar, LLP

(57) ABSTRACT

An optical trap for laser cooling and trapping atoms. Three pairs of laser beams are directed to cross in a vacuum chamber at a common intersection volume, wherein each pair is formed by two counterpropagating beams. Rather than having a mutually orthogonal arrangement in which each beam pair forms an angle $\chi$ of 45° to a reference axis, z, these angles are instead between $5° \leq \chi \leq 40°$. Moreover, in each beam pair, the counterpropagating beams are not precisely aligned in a common path, as in a conventional magneto-optical trap, but are slightly misaligned by respective misalignment angles [$\alpha$, $\beta$, $\kappa$] of typically 0.1° to 2°. The misalignment angles and beam widths are however selected so that a common intersection volume for all six beams is maintained. This provides an all-optical trap in which laser cooling and trapping of atoms takes place without a magnetic field being present.

19 Claims, 13 Drawing Sheets

(56) References Cited

OTHER PUBLICATIONS

P. J. Ungar, D. S. Weiss, E. Riis, and S. Chu, "Optical molasses and multilevel atoms: theory", JOSA B 6, 2058 (1989).
J. Dalibard and C. Cohen-Tannoudji, "Laser cooling below the doppler limit by polarization gradients: simple theoretical models", JOSA B 6, 2023 (1989).
S. Chu, M. Prentiss, A. Cable, and J. Bjorkholm, "Laser cooling and trapping of atoms", in Laser Spectroscopy VIII (Springer, 1987) pp. 58-63.
T. Walker, D. Sesko, and C. Wieman, "Collective behavior of optically trapped neutral atoms", Physical Review Letters 64, 408 (1990).
V. Bagnato, N. Bigelow, G. Surdutovich, and S. Zilio, "Dynamical stabilization: a new model for supermolasses", Optics letters 19, 1568 (1994).
A. Höpe, D. Haubrich, H. Schadwinkel, F. Strauch, and D. Meschede, "Optical Trapping in a Cesium Cell with Linearly Polarized Light and at Zero Magnetic Field", Europhysics Letters, vol. 28, No. 1 (1994).
S. Sharma, B. P. Acharya, A. H. N. C. De Silva, N. W. Parris, B. J. Ramsey, K. L. Romans, A. Dorn, and D. Fischer, "All-optical atom trap as a target for MOTRIMS-like collision experiments"; Phys. Rev. A 97, 043427 (2018).
A. Rauschenbeutel, H. Schadwinkel, V. Gomer, and D. Meschede, "Standing light fields for cold atoms with intrinsically stable and variable time phases", Optics communications 148, 45 (1998).
A. Ashkin and J. P. Gordon, "Stability of radiation pressure particle traps: an optical Earnshaw theorem", Optics letters 8, 511 (1983).
P. Bouyer, P. Lemonde, M. Ben Dahan, A. Michaud, C. Salomon, and J. Dalibard, "An Atom Trap Relying on Optical Pumping"; Europhysics Letters, vol. 27, No. 8, p. 569ff (1994).
R. Roy, J. Rushton, A. Dragomir, M. Aldous, and M. Himsworth, "A misaligned magneto-optical trap to enable miniaturized atom chip systems", Scientific reports 8, 10095 (2018).
V. Negnevitsky and L. D. Turner, "Wideband laser locking to an atomic reference with modulation transfer spectroscopy", Optics express 21, 3103 (2013).
M. Aldous, J. Woods, A. Dragomir, R. Roy, and M. Himsworth, "Carrier frequency modulation of an acousto-optic modulator for laser stabilization", Optics Express 25, 12830 (2017).
C. Gabbanini, A. Evangelista, S. Gozzini, A. Lucchesini, A. Fioretti, J. Müller, M. Colla, and E. Arimondo, "Scaling laws in magneto-optical traps", EPL (Europhysics Letters) 37, 251 (1997).
G. Gattobigio, T. Pohl, G. Labeyrie, and R. Kaiser, "Scaling laws for large magneto-optical traps", Physica Scripta 81, 025301 (2010).
G. W. Hoth, E. A. Donley, and J. Kitching, "Atom number in magneto-optic traps with millimeter scale laser beams", Optics letters 38, 661 (2013).
V.S. Letokhovand, V.G. Minogin, "Cooling, trapping, and storage of atoms by resonant laser fields", JOSA 69, 413 (1979).
T. Walker, D. Hoffmann, P. Feng, R.S. Williamson III, "A vortex-force atom trap", Physics Letters A, vol. 163, Issue 4, pp. 309-312 (1992).
Raziman, T. V. and Martin, Olivier J. F., "Universal trapping in a three-beam optical lattice", Phys. Rev. A, vol. 98, issue 2, pp. 023420 (2018).
International Search Report (ISR) (form 210) corresponding to counterpart International Patent Application PCT/EP2021/079961 mailed Feb. 8, 2022.
Written Opinion of the International Searching Authority (WO/ISA) (form 237) corresponding to counterpart International Patent Application PCT/EP2021/079961 mailed Feb. 8, 2022.
United Kingdom Intellectual Property Office (UKIPO) Search Report corresponding to priority application GB2017157.5 dated Apr. 13, 2021.
R. Hubele; M. Schuricke; J. Goullon; H. Lindenblatt; N. Ferreira; A. Laforge; E. Brühl; V. L. B. de Jesus; D. Globig; A. Kelkar; D. Misra; K. Schneider; M. Schulz; M. Sell; Z. Song; X. Wang; S. Zhang; Electron and recoil ion momentum imaging with a magneto-optically trapped target; Review of Scientific Instruments; Research Article; Mar. 10, 2015.

ATOMIC COOLING AND TRAPPING METHODS AND APPARATUS

This application is a continuation of U.S. application Ser. No. 18/248,157, filed Apr. 6, 2023, which is a national phase entry of International Application No. PCT/EP2021/079961 filed Oct. 28, 2021, which claims priority to United Kingdom Application No. 2017157.5 filed Oct. 29, 2020, each of which is hereby incorporated herein by reference in its entirety.

BACKGROUND OF THE INVENTION

The invention relates to the cooling and trapping of atoms with laser light.

During the early development of laser cooling and trapping in the late 1980's many research groups discovered that the temperature of the trapped atoms was far below the limit thought to be imposed by the Doppler cooling at the time. A careful exploration of methods to determine the temperature was carried out by Lett et al in 1988 [1] to confirm these findings, which were referred to at the time as "supermolasses" in comparison to Doppler-limited molasses cooling as it was then understood. In the following year, two groups independently submitted theoretical explanations identifying polarization gradient cooling (also referred to a Sisyphus cooling) as the mechanism behind the additional cooling effect [2, 3]. These theories relied upon the internal structure of the atoms to scatter additional energy via the polarization-dependent modulation of the atomic states. These above effects have been explored and are now fully understood. However, during this same period of uncertainty surrounding the supermolasses effect, another observation was made which has seen very little exploration. It was noted by Chu et al[4] that when the counterpropagating laser beams were slightly misaligned the number of atoms collected inside the molasses increased significantly, by well over an order of magnitude, and remained trapped for several seconds. Some aspects of this effect could be explained via "racetrack modes" [5]. However, this observation seems to have remained largely unexplored. One possible theoretical explanation was put forward [6] based around a model inspired by the Kapitza (or inverted) pendulum that involved vortex forces but has not been experimentally verified. Similar unexpected cooling and trapping of atoms in the absence of a magnetic field has also been reported elsewhere in the literature [7, 8]. The traps reported in both these references have three counter-propagating beam pairs orthogonally arranged along the three Cartesian axes. The trap of reference [7] required linearly polarised light, very good vacuum, and laser beams of large diameter (≥10 mm) to operate successfully. To produce a counter-propagating beam pair, each incident beam was reflected at a slight angle away from exact retro-reflection with misalignments in the range 0.5°-1° providing good performance. The postulated mechanism for trapping was the dipole force [9]. Like reference [7], the trap of reference [8] also used large-diameter beams and counter-propagating beam pairs that were slightly misaligned. The trap of reference [8] operated with either linear or circular polarization. Its operation needed loading from a standard Magnetic Optical Trap (MOT) before the magnetic field was extinguished, i.e. it could not form a cooled atom cloud direct from vapour. The authors consider a number of theoretical processes that could result in such a trap and in particular suggested the process may be related to a superlattice dipole trap.

The reason why cooling and trapping of atoms with solely optical fields, i.e. without magnetic fields, is unexpected is due to the optical equivalent of the Eamshaw theorem [10] that states:

$$\nabla F_S = 0 \quad (1)$$

where $F_S$ is the scattering force on a particle with scalar polarizability. In essence, the scattering force alone cannot produce a stable restoring force on a dipole in all dimensions because there are no sources or sinks of optical fields in free space. This limitation is typically overcome by manipulating the internal states of the atom via a Zeeman shift (as in a MOT) or AC Stark shifts (as in a dipole trap).

A purpose-designed all-optical trap is the optical trap developed by Bouyer et al [11], which is called the Trap Relying On Optical Pumping (TROOP). The TROOP uses uncollimated, i.e. divergent, beams of orthogonal circular polarization aligned along each Cartesian axis to produce a spatially varying, and thus positionally dependent, force via unbalanced laser power and optical pumping. Like a MOT or a dipole trap, the TROOP is also based on the manipulation of internal states.

SUMMARY OF THE INVENTION

According to a first aspect of the disclosure there is provided an optical trap for trapping and cooling atoms, the optical trap comprising:

- a vacuum chamber operable to provide a vacuum atmosphere in which atoms of an atomic species can be laser cooled via excitation of an electronic transition of the atomic species, referred to as the cooling transition;
- a laser source configured to generate laser light at a frequency detuned below the frequency of the cooling transition;
- an optical arrangement configured to manipulate the laser light to generate first, second and third beams with respective first, second and third beam widths, and to direct the first, second and third beams to propagate across the vacuum chamber along respective first, second and third incident beam paths that deviate from a mutually orthogonal arrangement in which they would each form an alignment angle of 45° to a reference axis, having instead respective first, second and third alignment angles of between 25° and 35° to the reference axis; and
- first, second and third reflectors arranged to reflect the first, second and third beams to propagate back across the vacuum chamber along their incident beam paths in respective first, second and third reflected beam paths that deviate from a retro-reflection, in which each reflected beam path would be coincident with its incident beam path, by respective first, second and third misalignment angles, the first, second and third misalignment angles and beam widths having values that define a volume of intersection within the vacuum chamber traversed by the first, second and third beams both when propagating along their incident beam paths and their reflected beam paths.

According to a second aspect of the disclosure there is provided a method of laser cooling and trapping atoms, the method comprising:

- providing a vacuum chamber containing atoms of an atomic species to be laser cooled in a vacuum atmosphere via excitation of an electronic transition of the atomic species, referred to as the cooling transition;

providing laser light at a frequency detuned below the frequency of the cooling transition;

providing first, second and third beams of the laser light with respective first, second and third beam widths;

directing the first, second and third beams to propagate across the vacuum chamber along respective first, second and third incident beam paths, wherein the first, second and third incident beam paths deviate from a mutually orthogonal arrangement in which they would each form an alignment angle of 45° to a reference axis, having instead respective first, second and third alignment angles of between 25° and 35° to the reference axis;

reflecting the first, second and third beams to propagate back across the vacuum chamber along their incident beam paths in respective first, second and third reflected beam paths that deviate from a retro-reflection, in which each reflected beam path would be coincident with its incident beam path, by respective first, second and third misalignment angles, the first, second and third misalignment angles and beam widths having values that define a volume of intersection within the vacuum chamber traversed by the first, second and third beams both when propagating along their incident beam paths and their reflected beam paths.

With this approach it is possible to provide an all-optical trap, i.e. one that does not rely on the presence of a magnetic field. Since no magnetic field is used for the cooling effect exploited by the present invention, of course a corresponding optical trap does not require any magnetic coils or any other form of magnetic field generator to be provided, since no magnetic field needs to be generated in the vacuum chamber. A Zeeman slower is also not needed.

An optical trap embodying the invention does not need to include a magnetic field generator, since laser cooling takes place without a magnetic field being present.

In certain embodiments, the misalignment angles comply with one or more of the following conditions:

each of the misalignment angles is greater than 0.1°;

each of the misalignment angles is less than 2θ;

at least one of the misalignment angles is greater than 0.5°; and at least two of the misalignment angles are greater than 0.5°.

In certain embodiments, the first, second and third alignment angles are equal to each other. In other embodiments, at least two of the first, second and third alignment angles are different from each other.

The first, second and third reflectors may be configured such that the reference axis and each pair of incident and reflected beam paths lie at least approximately in a common plane, thereby defining first, second and third such planes. The first, second and third planes may be approximately equally angularly spaced as viewed along the reference axis.

In certain embodiments, polarising components are arranged to provide the first, second and third beams with respective defined polarisation states when they enter the vacuum chamber. The first, second and third reflectors may be configured to ensure that the defined polarisation states of the first, second and third beams are preserved on reflection, e.g. circular polarisation or linear polarisation.

For certain atomic species, there is a further electronic transition, referred to as the repump transition, which is required to be excited for efficient cooling to occur. In such cases, the laser source or a further laser source is configured to generate further laser light at a further frequency tuned at the frequency of the repump transition. The optical arrangement may then further comprise a beam combiner operable to combine the laser light and the further laser light so that each of the first, second and third beams contain both the laser light and the further laser light.

Preferably, the first, second and third beams are at least approximately collimated as they cross the vacuum chamber. Approximate collimation may be characterised by the beam divergence, where a beam divergence ϴ=0 corresponding to a collimated beam, and approximate collimation as concerns the present invention may be a beam divergence, ϴ, less than or equal to one of 1, 2, 3, 4, 5, 6, 7, 8, 9 or 10 degrees.

While in principal embodiments, the first, second and third alignment angles form an angle of between 25° and 35° to the reference axis, other embodiments have alignment angles beyond this range. For example, the lower limit may be as low as any one of 20°, 21°, 22°, 23° or 24° and the upper limit may be as high as 36°, 37°, 38°, 39° or 40° to the reference axis.

According to a further aspect of the disclosure there is provided an optical trap for trapping and cooling atoms, the optical trap comprising:

a vacuum chamber operable to provide a vacuum atmosphere in which atoms of an atomic species can be laser cooled via excitation of an electronic transition of the atomic species, referred to as the cooling transition;

a laser source configured to generate first to sixth beams of laser light of respective first to sixth beam widths, the beams all having a frequency that is detuned below the frequency of the cooling transition;

an optical arrangement configured to:

direct the first, second and third beams to propagate across the vacuum chamber along respective first, second and third incident beam paths that deviate from a mutually orthogonal arrangement in which they would each form an alignment angle of 45° to a reference axis, having instead respective first, second and third alignment angles of between 5° and 40° to the reference axis; and direct the fourth, fifth and sixth beams to propagate across the vacuum chamber approximately along the beam paths of the first, second and third beams respectively but in opposite propagation directions to form three counter-propagating beam pairs, the beams of each counter-propagating beam pair deviating from respective paths in which their beam paths would be coincident by respective first, second and third misalignment angles, the first, second and third misalignment angles and the first to sixth beam widths having values that define a volume of intersection within the vacuum chamber traversed by all of the first to sixth beams.

There are multiple options for generating and suitably directing the cooling beams, For example, the cooling laser source may consist of one laser, whose output beam is split to generate the first to third beams. The cooling laser source may alternatively consists of three lasers, each generating one of the first to third beams, First, second and third reflectors may be provided, these being arranged to reflect the first, second and third beams after they have propagated across the vacuum chamber so that they propagate back across the vacuum chamber as the fourth, fifth and sixth beams respectively. The laser source may also consist of six lasers, each generating one of the first to sixth beams, in which case reflectors are not needed.

In certain embodiments, for each counter-propagating beam pair the two beam widths and the misalignment angle between the two beams are jointly configured to ensure that in the volume of intersection at least half the beam area of the beam with the smaller beam area intersects with the beam area of the beam with the larger beam area. Beam width is defined as the $1/e^2$ value and will be a beam diameter in the case of a beam of circular cross-section or two values for the major and minor axes in the case of a beam of elliptical cross-section.

In certain embodiments, the misalignment angles comply with one or more of the following conditions:

each of the misalignment angles is greater than 0.1°;
each of the misalignment angles is less than 2°;
at least one of the misalignment angles is greater than 0.5°; and
at least two of the misalignment angles are greater than 0.5°.

Polarising components may be arranged to provide the first to sixth beams with respective defined polarisation states when they enter the vacuum chamber.

In certain embodiments, the atomic species has a further electronic transition, referred to as the repump transition, which is required to be excited for efficient cooling to occur. The above-mentioned laser source or a further laser source is then configured to generate further laser light at a further frequency tuned at the frequency of the repump transition. A beam combiner may then be provided which is operable to combine the laser light and the further laser light so that each of the first to sixth beams contain both the laser light and the further laser light.

The first to sixth beams may be at least approximately collimated as they cross the vacuum chamber. Approximate collimation may be characterised by the beam divergence, where a beam divergence $\Theta=0$ corresponding to a collimated beam, and approximate collimation as concerns the present invention may be a beam divergence, $\Theta$, less than or equal to one of 1, 2, 3, 4, 5, 6, 7, 8, 9 or 10 degrees.

An optical trap according to the above designs differs from the prior art in that it does not need a magnetic field generator.

The first, second and third alignment angles may be between 20° and 40°, more especially 25° and 35°.

According to a further aspect of the disclosure there is provided a method of laser cooling and trapping atoms, the method comprising:

providing a vacuum chamber containing atoms of an atomic species to be laser cooled in a vacuum atmosphere via excitation of an electronic transition of the atomic species, referred to as the cooling transition;
providing laser light at a frequency detuned below the frequency of the cooling transition;
providing first, second and third beams of the laser light with respective first, second and third beam widths;
providing first to sixth beams of laser light having respective first to sixth beam widths and frequencies that are detuned below the frequency of the cooling transition;
directing the first, second and third beams to propagate across the vacuum chamber along respective first, second and third incident beam paths that deviate from a mutually orthogonal arrangement in which they would each form an alignment angle of 45° to a reference axis, having instead respective first, second and third alignment angles of between 5° and 40° to the reference axis; and
directing the fourth, fifth and sixth beams to propagate across the vacuum chamber approximately along the beam paths of the first, second and third beams respectively but in opposite propagation directions to form three counter-propagating beam pairs, the beams of each counter-propagating beam pair deviating from respective paths in which their beam paths would be coincident by respective first, second and third misalignment angles, the first, second and third misalignment angles and the first to sixth beam widths having values that define a volume of intersection within the vacuum chamber traversed by all of the first to sixth beams.

In summary, an optical trap for laser cooling and trapping atoms is provided that has three pairs of laser beams which are directed to cross in a vacuum chamber at a common intersection volume, wherein each pair is formed by two counterpropagating beams. Rather than having a mutually orthogonal arrangement in which each beam pair forms an angle $\chi$ of 45° to a reference axis, z, these angles are instead between $5°\leq\chi\leq40°$. Moreover, in each beam pair, the counterpropagating beams are not precisely aligned in a common path, as in a conventional magneto-optical trap, but are slightly misaligned by respective misalignment angles [$\alpha$, $\beta$, $\kappa$] of typically 0.1° to 2°. The misalignment angles and beam widths are however selected so that a common intersection volume for all six beams is maintained. This provides an all-optical trap in which laser cooling and trapping of atoms takes place without a magnetic field being present.

BRIEF DESCRIPTION OF THE DRAWINGS

This invention will now be further described, by way of example only, with reference to the accompanying drawings.

DETAILED DESCRIPTION

In the following the invention is described by way of example for cooling $^{85}Rb$ atoms. The invention is usable for any atomic species that is capable of being optically cooled. In principle any atoms from Group I or II of the periodic table are amenable to optical cooling. In practice to date, atomic species for which optical cooling has been demonstrated include: Rb, Cs, Li, Sr, Ca, K and Fr. In the case of Sr, it is further noted that a repump is not needed, so the corresponding equipment described below in connection with repump would be omitted.

Figure 1:
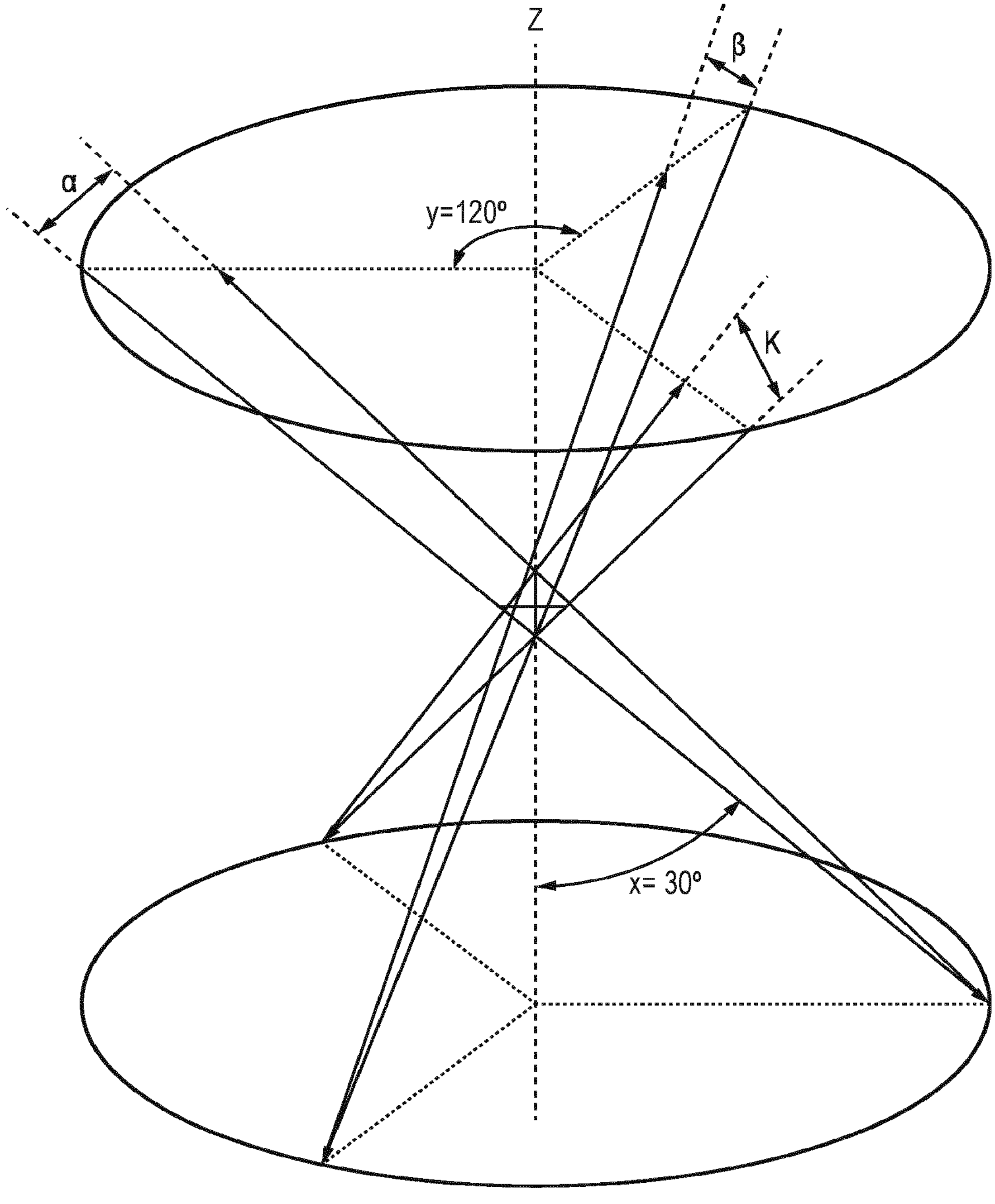
FIG. 1 is a schematic perspective drawing showing the laser beam geometry used in an optical trap embodying the invention.

FIG. 1 is a schematic perspective drawing showing the laser beam geometry used in an optical trap according to embodiments of the invention. The two circles represent two vertically offset planes, perpendicular to the z-axis. The various beam paths are indicated schematically by respective straight lines corresponding to their principal optical axes with arrows indicating the direction of beam propagation. For ease of representation, the finite beam cross-sections of the beams are not illustrated.

Three laser beams travel along respective incident beam paths (lines with arrows pointing down) with circular polarisation collectively to form a tripod-like arrangement. The incident beam paths are equally spaced radially about the z-axis and so form angles of $\gamma=120°$ to each other as viewed along the z-axis. The equal radial spacing may not be exact. For example, deviations from a radial spacing of 120° may be possible, e.g. by up to ±1°, ±2°, ±3°, ±4°, ±5°, ±6°, ±7°, ±8°, ±9°, ±10°. The three incident beam paths are aligned at an inclination angle $\chi$ away from the z-axis. A common inclination angle is shown with a value of $\chi=30°$, but in other embodiments unequal inclination angles could be used. Each incident beam path thus lies in a plane containing the z-axis and forms an inclination angle $\chi$ to the z-axis. Each of these three planes subtends an angle of 120° to the other two planes to provide equal angular spacing of the three beams. In the following description, the laser beams are assumed to be collimated. In practice, collimated, or at least only weakly diverging or converging beams, will be needed. Each beam is reflected back from its incident beam path into a reflected beam path, the reflections taking place in the plane of the lower circle. Each reflection is performed so as to maintain the polarisation state of the beam, e.g. circular or linear. Preservation of circular polarisation may be achieved by a quarter waveplate and dielectric mirror combination. The three reflected beam paths (lines with arrows pointing up) are misaligned by respective angles [$\alpha$, $\beta$, $\kappa$] away from retro-reflection, where retro-reflection is when the reflected beam path is coincident with its incident beam path. The inclination of the misalignment in each case is towards the z-axis, i.e. each reflected beam path lies in the same above-mentioned plane as its incident beam, but with a reduced angle of inclination to the z-axis. The angles [$\alpha$, $\beta$, $\kappa$] may in general be different from each other but they could be all the same, or two of them could be the same.

As a further geometrical observation, it is noted that all six beam paths cross the z-axis at respective points. FIG. 1 shows the incident beam paths having a common crossing point, whereas, since the misalignment angles are generally not equal, the three reflected beam paths will generally cross the z-axis at different points, each slightly above the common point where the incident beam paths cross. The misalignment angles [$\alpha$, $\beta$, $\kappa$] and finite beam widths result in a volume of intersection being formed which is the volume traversed by the beams both along their incident beam paths and along their reflected beam paths. The six beam components interfere with each other in the volume of beam intersection. This interference is what causes the cooled atom cloud to be formed in the volume of intersection.

For efficient operation of the an optical trap according to embodiments of the invention, it is considered to be necessary that all the beams are at least approximately collimated and that the beam diameters, inclination angles and misalignment angles are chosen collectively such that all six beam components cross in a common region (the volume of beam intersection).

In experiments performed to date with a common inclination angle of 30°, for efficient cooling and trapping to form a cloud in the volume of beam intersection directly from vapour, the misalignment angles had typical magnitudes from 0.1° to 2° in combination with beam diameters around 5 mm, where beam diameter is taken as the $1/e^2$ value of a Gaussian fit, noting that the range of useable misalignment angles depends on beam diameter, with larger beam diameters allowing larger misalignment angles. For good performance, it also seems necessary for at least two of the misalignment angles to be different from each other.

In particular, very good performance is seen with the following combination of misalignment angles: a first beam path pair has a misalignment angle such that the incident and reflected beams are separated by approximately half a beam width in the volume of beam intersection. A second beam path pair has a misalignment angle set to a very small value, perhaps 5-20 times lower than that of the first beam pair. The third beam path pair has a misalignment angle set to approximately the same or somewhat more than for the first beam path pair, perhaps 1-2 times.

An important experimental observation is that formation of a cooled atom cloud from vapour is not at all sensitive to these geometric parameters or the level of detuning. Rather, it is easy to find a parameter combination that results in formation of a cloud from vapour, and, once cloud formation occurs, it is easy to optimize the parameter combination, since cooling performance gradually and monotonically improves or worsens when one of these parameters is adjusted. Consequently, it is experimentally straightforward to adjust one parameter at a time in a stepwise or continuous manner, for example, each misalignment angle in turn, or the cooling detuning level, to improve the cloud formation, e.g. in terms of its temperature, shape or density, to find an optimum parameter combination for forming a dense, cold and approximately spherically shaped cloud.

From simple trigonometry, the misalignment angle value that causes the incident and reflected beam paths to be separated by half a beam width at the crossing point is met when the misalignment angle θ is:

$$\theta = \tan^{-1}\frac{r}{l}$$

where r is the beam radius, i.e. half the beam diameter, and l is the distance from the reflection plane to the crossing point.

Experiments to date show that the optical trap's performance is comparable to that of a conventional MOT in terms of atom numbers (~1°8), cloud density ($10^{11}$ atoms/cm$^3$) and cloud temperature (<50 μK). The atom cloud formed at the volume of beam intersection is typically millimetre-sized and has a somewhat elongate (roughly ellipsoid) shape with the long axis of the ellipse aligned along one of the beam paths. The cloud shape and cloud volume can be manipulated experimentally by incrementally adjusting the magnitude of one or more of the misalignment angles [α, β, κ]. This effect can be exploited to find an optimum combination of misalignment angles by incrementally reducing both the size of the cloud and its aspect ratio, so as to form a small, dense cloud with a near-spherical shape, as is usually desired.

Figure 2:
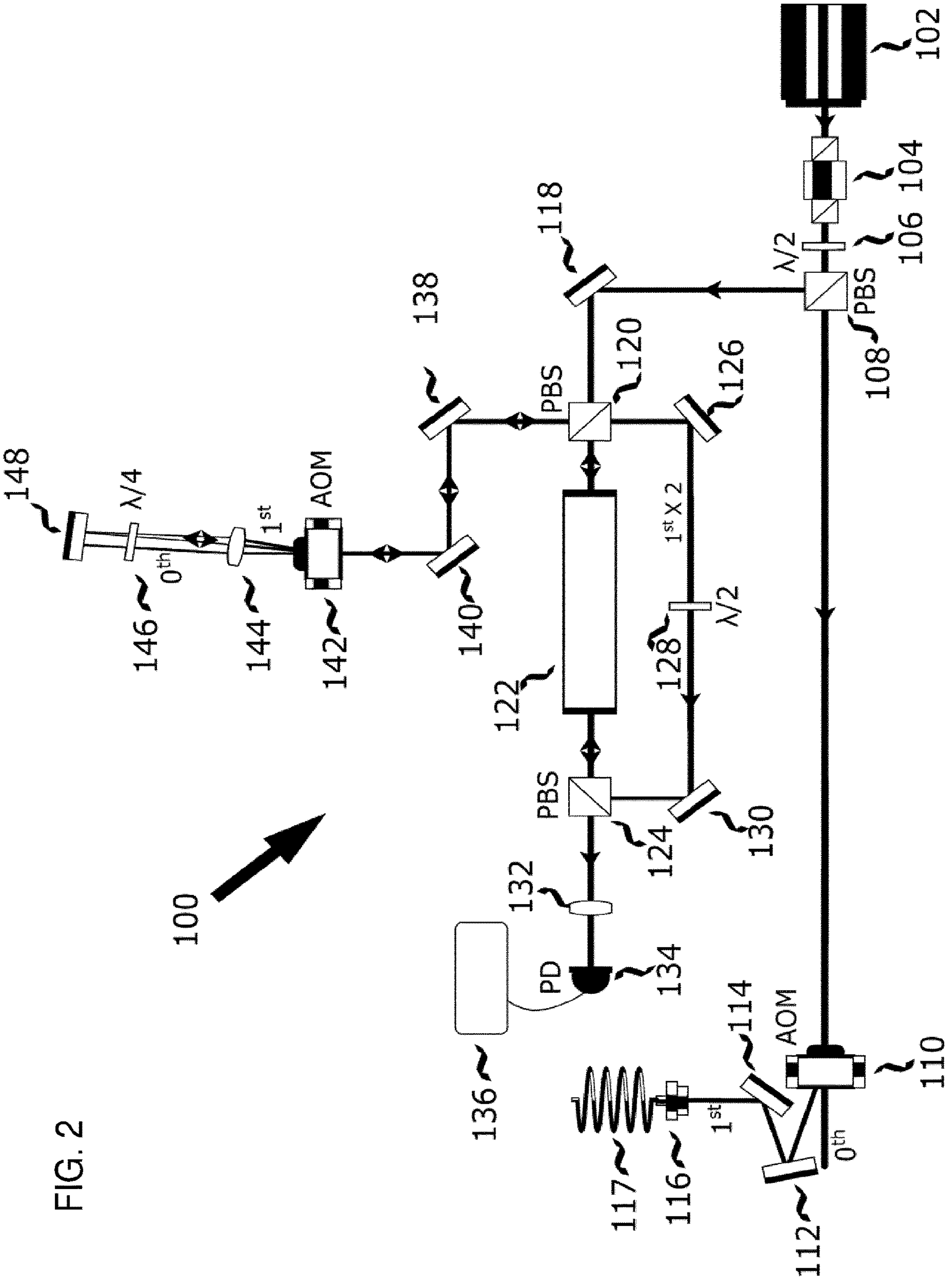
FIG. 2 shows an optical setup for providing a stabilised cooling laser beam.
Figure 3:
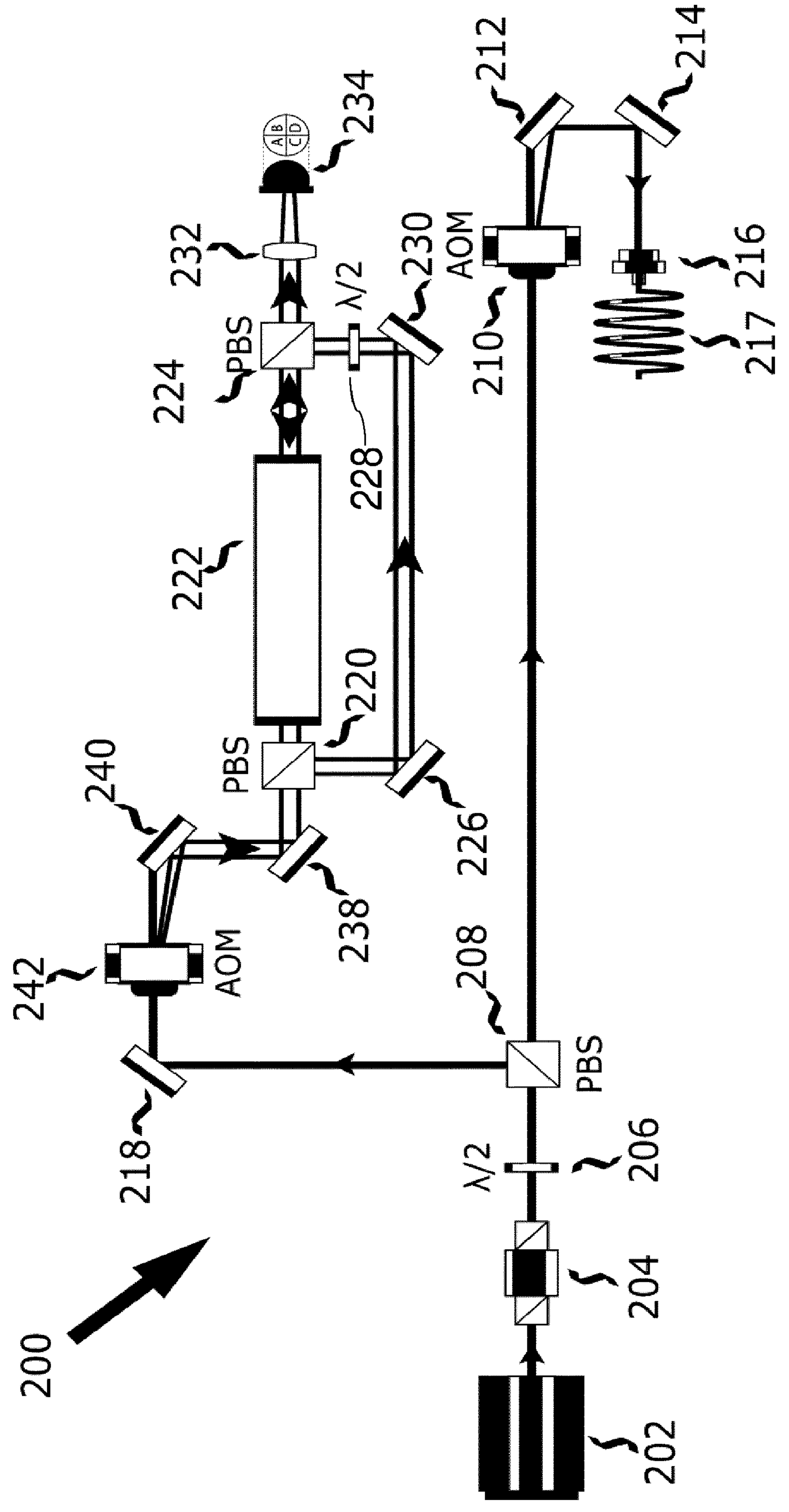
FIG. 3 shows an optical setup for providing a stabilised repump laser beam.
Figure 4:
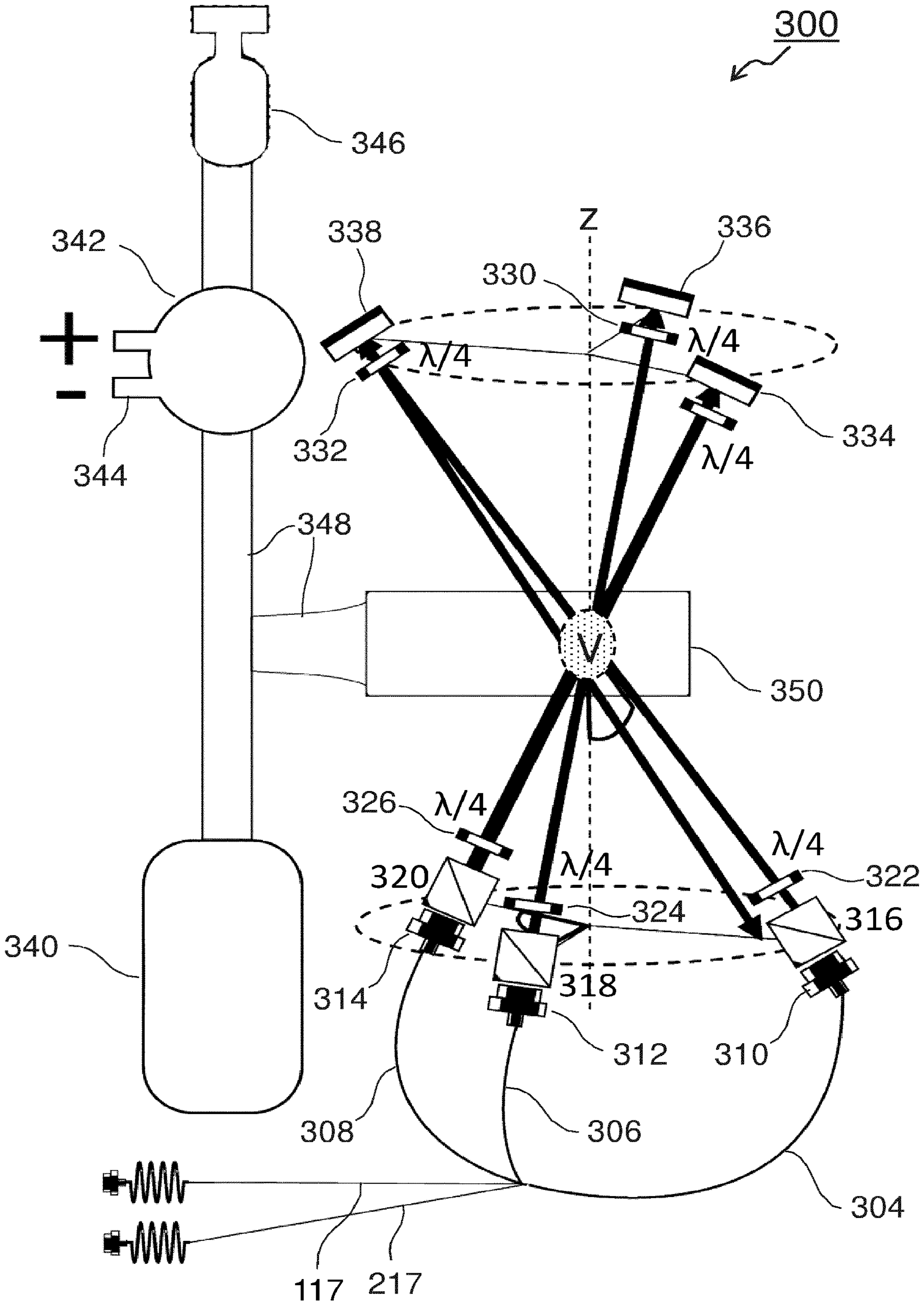
FIG. 4 shows a setup for the optical trap.

FIGS. 2 to 4 are schematic drawings showing various parts of a system used to demonstrate optical trap operation experimentally with a vapour of $^{85}$Rb atoms.

FIGS. 2 and 3 show optical setups for providing stabilised cooling and repump laser beams respectively. It is noted that both these stabilisation schemes are known, and also that the skilled person knows of other stabilisation schemes that would be suitable. FIG. 4 shows the system setup around the optical trap's vacuum chamber.

With reference to FIG. 2, the cooling setup 100 is based on a laser source 102, which is a distributed feedback diode (DFB) laser. The DFB has a centre wavelength of 780 nm, linewidth of ~0.6 MHz and output power range 20-80 mW. The cooling laser is stabilised to the $^{85}$Rb transition:

$$5^2S_{1/2}F=3\rightarrow 5^2P_{3/2}F'=4$$

using modulated transfer spectroscopy [13]. The beam from the cooling laser 102 is initially passed through an optical isolator 104 and half-wave plate 106. A polarising beam splitter (PBS) 108 is arranged in the beam to divide it into two branches. One branch, having a small fraction of the beam power, is used as input to control a laser stabilisation system (vertical branch), whilst the remainder of the optical power, referred to as the main beam, ultimately provides the incident beams to the trap (straight-through branch). The stabilisation branch is supplied via a mirror 118 to a further PBS 120 which again divides the beam into two. The straight-through branch from the PBS 120 leads directly to a vapour cell 122 and forms the probe beam of a pump-probe scheme, the probe beam having the frequency of the laser 102. The probe beam thus traverses the vapour cell 122 from right-to-left in the drawing. The branch deflected from the PBS 120 is used to generate the pump beam. The pump beam branch is directed by further mirrors 138 and 140 to an acousto-optical modulator (AOM) 142. The AOM 142 diffracts the input beam to output zeroth and two first order diffraction beams. These three beams are reflected back from a mirror 148 and on their passage back through the AOM 142 are recombined into a single beam. A quarter-wave plate 146 is arranged between the AOM 142 and the mirror 148 to provide the desired circular polarisation. The combined, reflected beam passes via mirrors 140 and 138, straight-through passage through the PBS 120, further routing with mirrors 126 and 130 and a further PBS 124, as well as via passage through a half-wave plate 128, to traverse the vapour cell 122 as the pump beam from left-to-right in the drawing, i.e. in the opposite direction to the probe beam. These components thus collectively form a saturated absorption spectroscopy arrangement to generate an error signal from four-wave mixing in the rubidium atoms contained in the vapour cell. In the vapour cell, each of the pump and probe beams traversing the vapour cell 122 generates a sub-Doppler spectrum, slightly shifted in frequency relative to the other. By subtracting the resultant spectra, an error signal is generated from the photodiode output. The first order diffracted beam used for the laser stabilisation is composed of the main carrier of frequency $\omega_C=\omega_0+\omega_{AOM}$ with sidebands of frequency $\omega_S=\omega_C\pm\omega_{mod}$. The double-pass through the AOM 142 further modulates the main carrier beam, which now has a frequency of $\omega=\omega_0+2\omega_{AOM}$ with sidebands offset by $\pm\omega_{mod}$. In the experimental set-up, the pump beam has a frequency shift of $\omega_{shift}$=160 MHz with an additional modulation of $\omega_{mod}=2\pi\times 0.3$ MHz. Considering that the atoms move inside the vapour cell with velocity v, they interact with the probe beam at the frequency of $\omega_{probe}=\omega_0-kv$. In the case of the pump beam, the atoms interact at a frequency of $\omega_{pump}=\omega_0+2\omega_{AOM}+kv$, where ±k are the pump and probe beams wavevectors. A spectrum is generated only when the atoms resonate with both beams simultaneously. Therefore, the only atoms that interact are those that are travelling towards the probe beam with a velocity of $v=\omega_{AOM}/k$. Since the error signal is generated from two sidebands of the first order diffracted beam, the feedback from the error signal will stabilise the laser 102 at an output frequency of $\omega_0+\omega_{AOM}$, i.e. shifted by $\omega_{AOM}$ from what is required. In order to reverse this shift, a further AOM 110 is arranged in the path of the main laser beam. The first order diffraction beam output from the AOM 110 at frequency $\omega_0$ is then supplied via mirrors 112 and 114 to an optical fibre coupler 116 to couple the light into an optical fibre 117, which is used for convenient delivery of the cooling laser beam to the trap. The amount of laser detuning, δ, below the resonant frequency (i.e. so-called red detuning), in this case from the $^{85}$Rb cooling transition, is conveniently represented in units of Γ, where Γ=2π×6 MHz is the natural decay rate of $^{85}$Rb. For the example system, the detuning δ=−1.5Γ. The error signal is extracted from the left-hand-side output of the vapour cell 122 via a PBS 24 (straight-through path), focusing lens 132 and photodiode 134. The electrical signal output from the photodiode 134 is then amplified and demodulated with suitable demodulation electronics 136 to generate the error signal. The error signal is then fed back in a feedback loop via a proportional-integral-derivative (PID) controller to control the laser 102 by adding the error signal as a modulation to the laser's drive signal.

With reference to FIG. 3, the repump laser set up 200 is based on a laser source 202, which is matched to form a pair with the cooling laser source 102, i.e. in this example being another DFB with the same specifications. The repump laser is stabilised to the following $^{85}$Rb transition:

$$5^2S_{1/2}F=2\rightarrow 5P_{3/2}F'=3$$

using carrier modulation spectroscopy [14]. The repump laser 202 is stabilised using a similar approach to the cooling laser, but without the need for dedicated demodulation electronics for demodulating the signal [14]. The repump laser beam is passed through an optical isolator 204 and a half-wave plate 206. Then a PBS 208 is used to separate the repump laser beam in two. One beam, having a small fraction of the beam power, is used as input to control a laser stabilisation system (vertical branch), whilst the remainder of the optical power, referred to as the main beam, ultimately provides the incident beams of the trap (straight-through branch). The branch for laser stabilisation is supplied via a mirror 218 to an AOM 242, the AOM 242 having an additional modulation applied on top of its native frequency, as described above in the cooling laser stabilisation set-up. The modulation added to the AOM 242 is in the form of a square wave of frequency $\omega_{mod}$=17 MHz. This causes the first order diffracted beam from the AOM to split into two components of frequencies $\omega_1=\omega_0+\omega_{AOM}+\omega_{mod}$ and $\omega_2=\omega_0+\omega_{AOM}-\omega_{mod}$ which respectively form pump and probe beams for a saturated absorption spectroscopy arrangement based around a vapour cell 222 containing Rb vapour. The probe beam passes through the PBS 220 and traverses the vapour cell 222 from left-to-right in the drawing. The pump beam is routed via deflection by the PBS 220 and suitable mirrors 226 and 230 as well as passage through a half-wave plate 228 and finally deflection by a further PBS 224 to traverse the vapour cell 222 from right-to-left in the drawing, i.e. in the opposite direction to the probe beam. The probe beam output from the vapour cell 222 via the straight-through branch of the PBS 224 is focused by a lens 232 onto a quadrant photodiode 234. (As an alternative to a quadrant photodiode 234 a balanced photodiode or two separate photodiodes could be used.) The error signal is obtained from the probe beam output of the vapour cell 222 via a PBS 224 (straight-through path), focusing lens 232 and photodiode 234. In the vapour cell, each of the pump and probe beams traversing the vapour cell 222 generates a sub-Doppler spectrum, slightly shifted in frequency relative to the other. By subtracting the resultant spectra, an error signal can be generated from the photodiode segment outputs. The error signal is then fed back in a feedback loop via a proportional-integral-derivative (PID) controller to control the laser 202 by adding it as a modulation to the laser's drive signal. Since the error signal is generated from two sidebands of the first order diffracted beam, the feedback from the error signal will stabilise the repump laser at an output frequency of $\omega_0+\omega_{AOM}$, i.e. shifted by $\omega_{AOM}$ from what is required. In order to reverse this shift, a further AOM 210 is arranged in the path of the main laser beam, similar to the cooling laser stabilisation system. The first order diffraction beam output from the AOM 210 at frequency $\omega_0$ is then supplied via mirrors 212 and 214 to an optical fibre coupler 216 which couples the beam into an optical fibre 217, which is used for convenient delivery of the repump laser beam to the trap. An advantage of this repump stabilisation system is that it does not require complicated electronics and so is suited to portable, low-power systems.

The above-described detuning of the cooling and repump lasers from resonance is achieved using AOMs. An alternative would be to use a scheme based on a single laser source and then the laser beam could be used to generate both the cooling and repump beams with an electro-optic modulator (EOM). An EOM is a device which modulates the phase of a beam by driving a low frequency electric field across a crystal that exhibits in response a linear shift of its refractive index.

After stabilisation as described above with reference to FIGS. 2 and 3, the cooling and repump beams are combined into a single beam and delivered to the optical trap in the beam geometry shown in FIG. 1.

FIG. 4 shows the experimental setup for the optical trap 300 that was used in the example setup. The cooling and repump beams are delivered to the optical trap setup 300 via the respective optical fibres 117, 217. The cooling and repump beams are first combined with a 2-to-1 fibre coupler 301. In the experiments, this was done with a 3:1 power ratio of cooling:repump. The combined beam is then split into three components of equal power by a 1-to-3 fibre splitter 302. The respective output sides of the splitter 302 are three sections of optical fibre 304, 306, 308. These combining and splitting functions can be achieved in optical fibre using appropriate combiners and splitters taking care to preserve polarisation as desired, e.g. using non-polarising or polarisation preserving combiners, splitters and fibre. Alternatively, free-space optical components could be used for the combining and splitting. The optical fibres 304, 306, 308 terminate in respective optical fibre couplers 310, 312, 314 which are arranged to provide the beam geometries for the incident beam paths as described above with reference to FIG. 1.

In the example set-up, the three beams output from the respective optical fibre couplers 310, 312, 314 have an approximate Gaussian power distribution in cross-section and are each collimated with a collimator lens (not separately shown) to a diameter of 5.4 mm, where the diameter is taken as the $1/e^2$ value. The light polarisation state in the three beams output from the optical fibres 310, 312, 314 is set to circular using respective PBSs 316, 318, 320 and quarter waveplates 322, 324, 326. The three beams then traverse a vacuum chamber 350 which has windows that are transparent to the wavelengths of the beams or is entirely made of transparent material, e.g. a suitable glass. After traversing the vacuum chamber 350 each beam is reflected by a quarter waveplate and dielectric mirror combination 328/334, 330/336, 332/338 where the reflection is close to retro-reflection, i.e. reflection back along the same path, but slightly misaligned, as described above with reference to FIG. 1. After reflection, the beams then traverse the vacuum chamber 350 for a second time.

As discussed with reference to FIG. 1, because of the finite beam widths (i.e. cross-sections) of the incident and reflected beam components, a volume of intersection of the beams, V, shown schematically with a dotted ellipse in FIG. 4, is formed within the vacuum chamber 350. The vacuum chamber 350 is formed in the example set-up by an anti-reflection coated glass vacuum cell with dimensions of 3 cm×3 cm×10 cm. The rubidium atoms in the vacuum chamber are cooled and concentrated in a cloud within the beam intersection volume V.

The vacuum chamber 350 is operable to provide a vacuum atmosphere through the action of a suitable vacuum pump 340, e.g. an ion pump, arranged in fluid communication with the vacuum chamber 350 via appropriate vacuum conduits 348. A vacuum valve 346 for the vacuum space is also provided. In the example experiments, the vacuum cell was generally maintained at a vacuum of $4\times10^{-1}$ mbar. The vacuum space also includes a source of atoms to be cooled, in the example setup an atom source 342 provides the rubidium atoms. The rubidium atoms are release by heating the source material, e.g. with an electrical heater element 344 that is operable to supply a DC current to heat the source material. In the example experiments, the rubidium vapour is provided by an alkali metal dispenser which increases the background vapour pressure to $5\times10^{-9}$ mbar during operation of the trap. Other forms of heating, e.g. with laser light, may also be used.

In order to characterise the behaviour of the optical trap, the number of trapped atoms, N, and their temperature, T, are measured as a function of various parameters including total beam power, P, and the level of red detuning, δ, of the cooling laser from the $^{85}$Rb cooling transition. In the following, the stated values of the total beam power represent the sum of the powers of all three incident beams, which includes the powers of both cooling and repump components. As already mentioned above, the power ratio between the cooling and repump components is 3:1 and the three incident beams have equal power.

Figure 5:
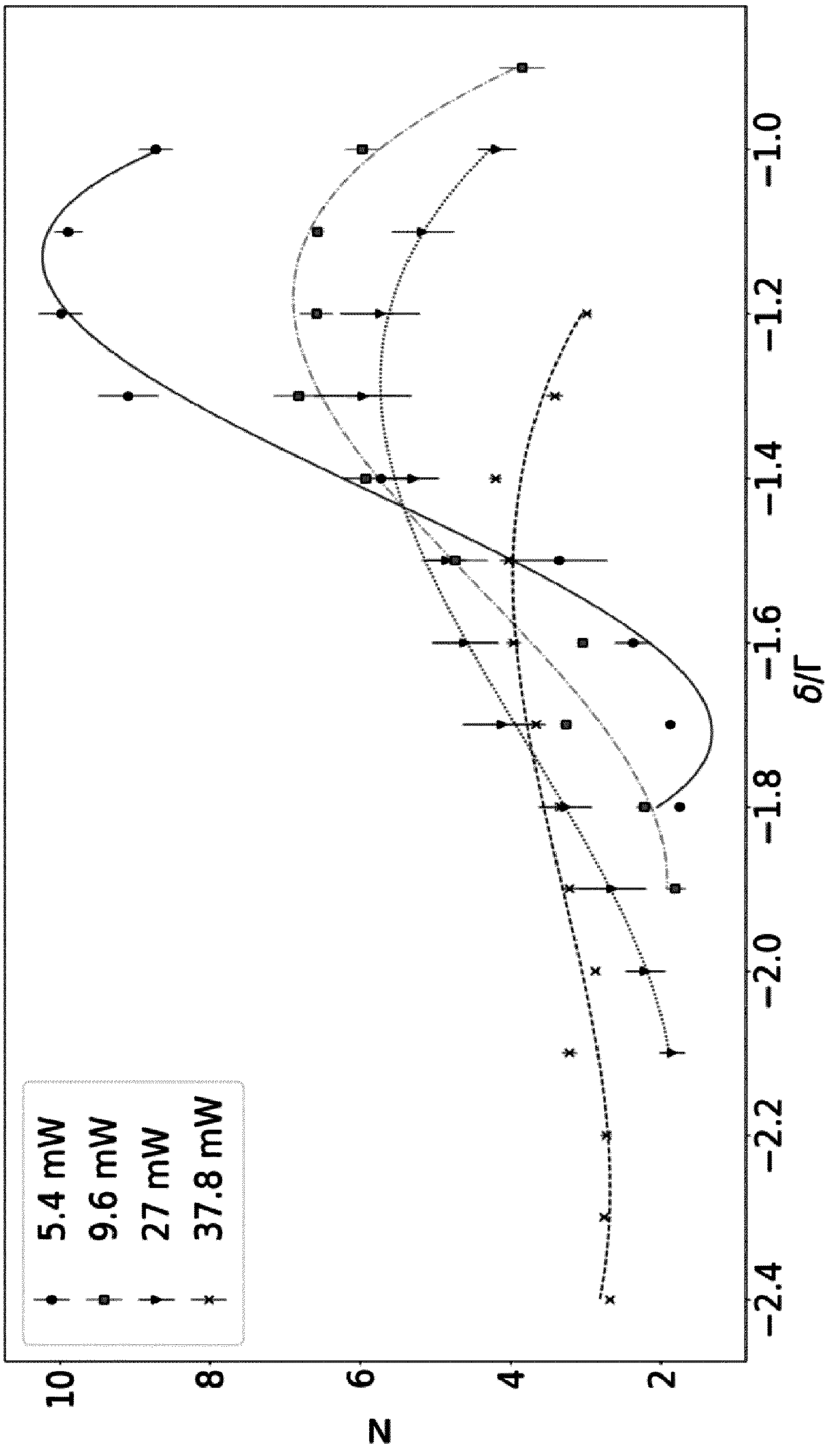
FIG. 5 is a graph showing experimental results from the optical trap of FIGS. 1 to 4, the graph plotting the variation in the number of trapped atoms, N, as a function of red detuning frequency, $\delta$, for different values of total beam power, namely 0.9 mW, 1.6 mW, 4.5 mW and 6.3 mW.

FIG. 5 is a graph showing, for four different values of total beam power (0.9 mW, 1.6 mW, 4.5 mW and 6.3 mW), the mean number of trapped atoms, N, as a function of detuning, δ, to lower frequencies (i.e. so-called red detuning) referenced to the $^{85}$Rb cooling transition, the detuning, δ, being represented in units of Γ, where $\Gamma=2\pi\times6$ MHz, which is the natural decay rate of $^{85}$Rb. The atom number was measured via the fluorescence from the atom cloud which was collected by a photodiode (not shown) using a simple non-magnifying optical system which is assumed to have minimum loss in light collection. The trap was loaded with rubidium atoms by heating a suitable rubidium source optically or electrically for ten seconds. Each data point in the graph is the mean of three measurements and the error bar shows the range of the three measurements. The maximum atom number, N, in the cloud of approximately $1\times10^8$ is observed for a total beam power of 0.9 mW with a detuning to lower frequencies of $\delta=-1.2\Gamma$. More generally, it is seen that the maximum atom number in the cloud reduces with increasing intensity in a non-linear manner. The experimental results show that the maximum number of atoms is obtained at relatively low power and with small levels of detuning compared to the behaviour of MOTs [15, 16]. Comparing the number of trapped atoms, N, with what would be expected from MOT scaling laws [17] and with comparable beam diameters, d, and beam powers, the experimental results show that the optical trap is capable of trapping almost an order of magnitude more atoms than a comparable MOT. The optical trap performance is closer to a N proportional to $d^6$ scaling prediction, compared to the N proportional to $d^{3.6}$ scaling found in MOTs with d>2 mm. It is a significant practical advantage for the optical trap according to embodiments of the invention that large numbers of atoms can be trapped at low beam powers, since this makes the technique inherently suited to low power applications, e.g. battery-operated and/or small devices, such as may be needed in quantum computing or other quantum technologies.

Figure 6A:
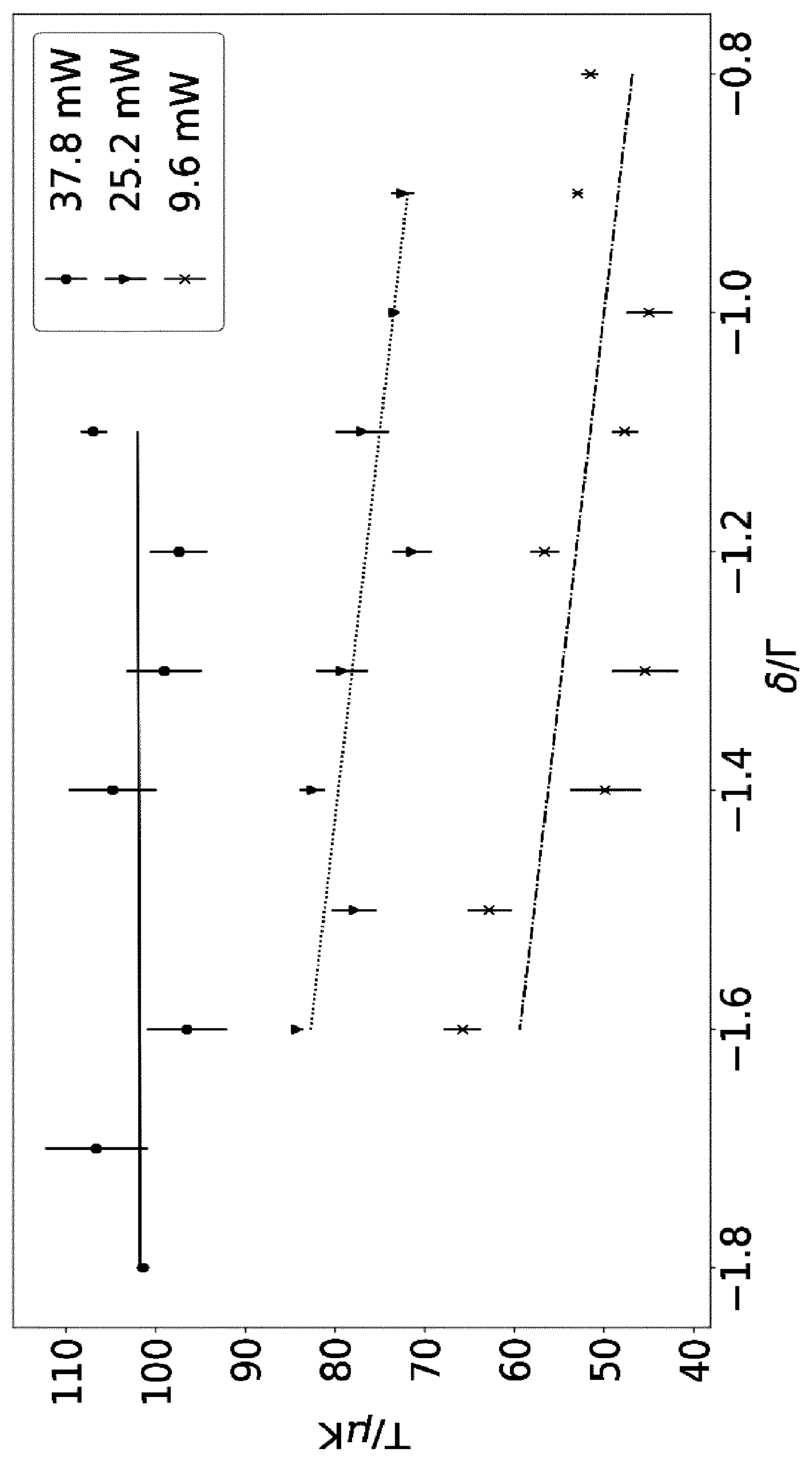
FIGS. 6A and 6B are graphs showing experimental results from the optical trap of FIGS. 1 to 4, the graphs showing the mean temperature, T, of the atoms expanding along the long axis (FIG. 6A) and short axis (FIG. 6B) of the atom cloud as a function of red detuning frequency, $\delta$, of the cooling laser for three different values of total beam power, namely 1.6 mW, 4.2 mW and 6.3 mW.
Figure 6B:
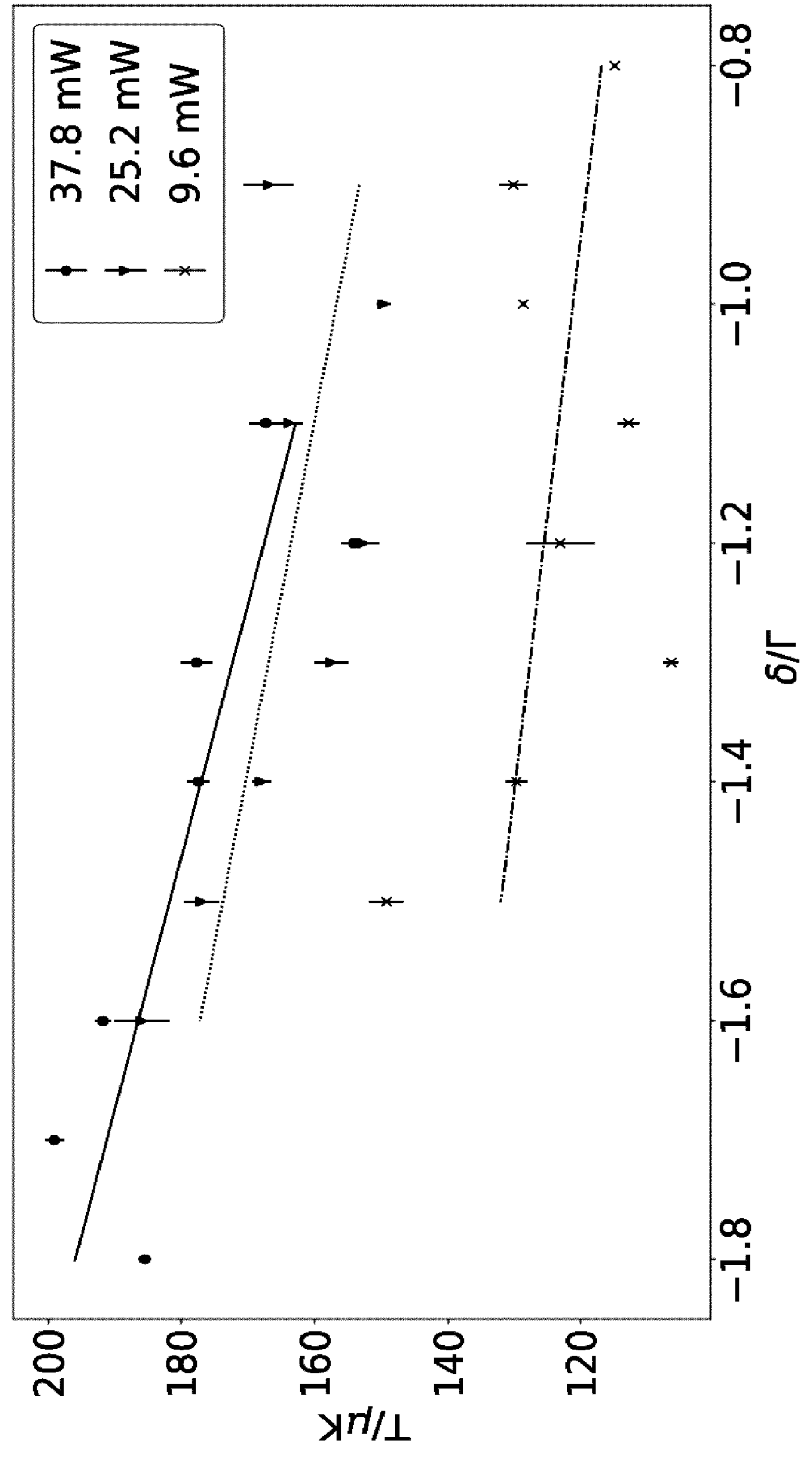

FIGS. 6A and 6B are graphs showing experimental results from the optical trap. For three different values of laser beam power (1.6 mW, 4.2 mW and 6.3 mW), the graphs show the mean temperature, T, of the atoms as a function of red detuning frequency, δ, in units of Γ, i.e. the same x-axis as FIG. 5. FIG. 6A shows results expanding along the long axis of the atom cloud, i.e. generally along the incident/reflected beam direction, and FIG. 6B expanding along a short axis of the atom cloud, i.e. in a direction transverse thereto. The temperature of the atom cloud was measured using the time-of-flight method. The cooling and repump beams were extinguished for up to 12 ms to allow the atom cloud to expand. The cloud was then illuminated and imaged using a fast camera. The width of the atom cloud after each time-of-flight measurement was determined by a two-dimensional Gaussian fit to the profile of the captured image. Due to the elongate shape of the cloud, the temperature was measured along both the long and short axes of the cloud. The mean value of three time-of-flight measurements forms a single data point in the results presented in FIGS. 6A and 6B. These results show that the temperature of the atom cloud is only weakly dependent on detuning, varying by ~10% for the detuning ranges covered, but is strongly dependent on beam power. Moreover, comparing FIG. 6A with FIG. 6B, it is seen that atoms moving in a direction aligned with the short axis of the cloud are generally hotter than those moving in alignment with the long axis, i.e. cooling along the beam direction is more effective than cooling transverse thereto. The lowest measured temperatures were 40 μK for atoms expanding along the long axis of the cloud and 120 μK for the short axis. For both axes, the lowest temperatures were achieved at the lowest red detuning values ($\delta=-0.8\Gamma$) and with the lowest beam powers (1.6 mW). These results further show that the optical trap appears to be most efficient at low red detuning from the cooling transition and at small laser powers, unlike the trends found in MOTs. More generally, it is seen that the mean temperatures are strongly dependent on beam power but only weakly on the amount of detuning, although a weak trend towards lower temperatures with smaller levels of detuning is evident.

The physical mechanisms behind the experimental results of FIG. 5 and FIGS. 6A and 6B are now discussed. The directional effect seen in FIGS. 6A and 6B is likely due to the stronger Doppler shifts along the beam wavevectors resulting in greater molasses cooling. Simple analytical modelling of the cooling and trapping forces resulting from scattering alone cannot produce a stable trap in three dimensions, so we can discount mechanisms such a spatially varying intensity imbalances as found in [12]. We suspect the spatially restoring force to be the dipole force, due to the shift of the peaks in FIG. 5 which may be due to AC-Stark shifts. The flattening out of the distribution is likely caused by saturation of the state. Typically, dipole traps are tuned far off-resonance to reduce the effect of heating through single photon scattering. To counter the reduced force, the intensity of the trapping beams must be well above saturation. Typically, dipole traps use a laser detuned by several nanometres from resonance and with several Watts of optical power focused to a diffraction-limited spot. As shown by Letokhov and Minogin [18], as one tunes the laser close to resonance, cooling and trapping in an optical lattice is possible, albeit with a trap depth equal to the heating induced by scattered photons. The near-resonant dipole trap suggested by Letokhov and Minogin has chiefly been neglected as it was deemed to be too 'leaky' as the trap depth would be on the order the Doppler cooling limit. However, this trap was proposed nearly a decade before polarization gradient cooling was discovered. If the atoms are efficiently cooled to sub-Doppler temperatures as they enter the dipole trap (as one typically does in a MOT), then they should remain trapped. If this is also the process that is operating within the optical trap according to embodiments of the invention, then the question arises as to why such efficient cooling of atoms directly from the background vapour occurs, and in sufficient quantities, is observed in the experimental results. The suggestion of a superlattice in [8] could be the answer, if the lattice pitch is large enough to cool atoms with velocities of several tens of metres/sec. To understand this better, we have explored the scale of each effect via simulations and simplified analytical models as discussed in the following.

The variation of the final (trapped) number of atoms with the laser power and detuning is investigated by conducting a number of simulations with different initial randomised atom configurations, before averaging to obtain a final atom number. The simulations take account of interactions between the atoms and the laser beams and AC Stark detuning.

Figure 7:
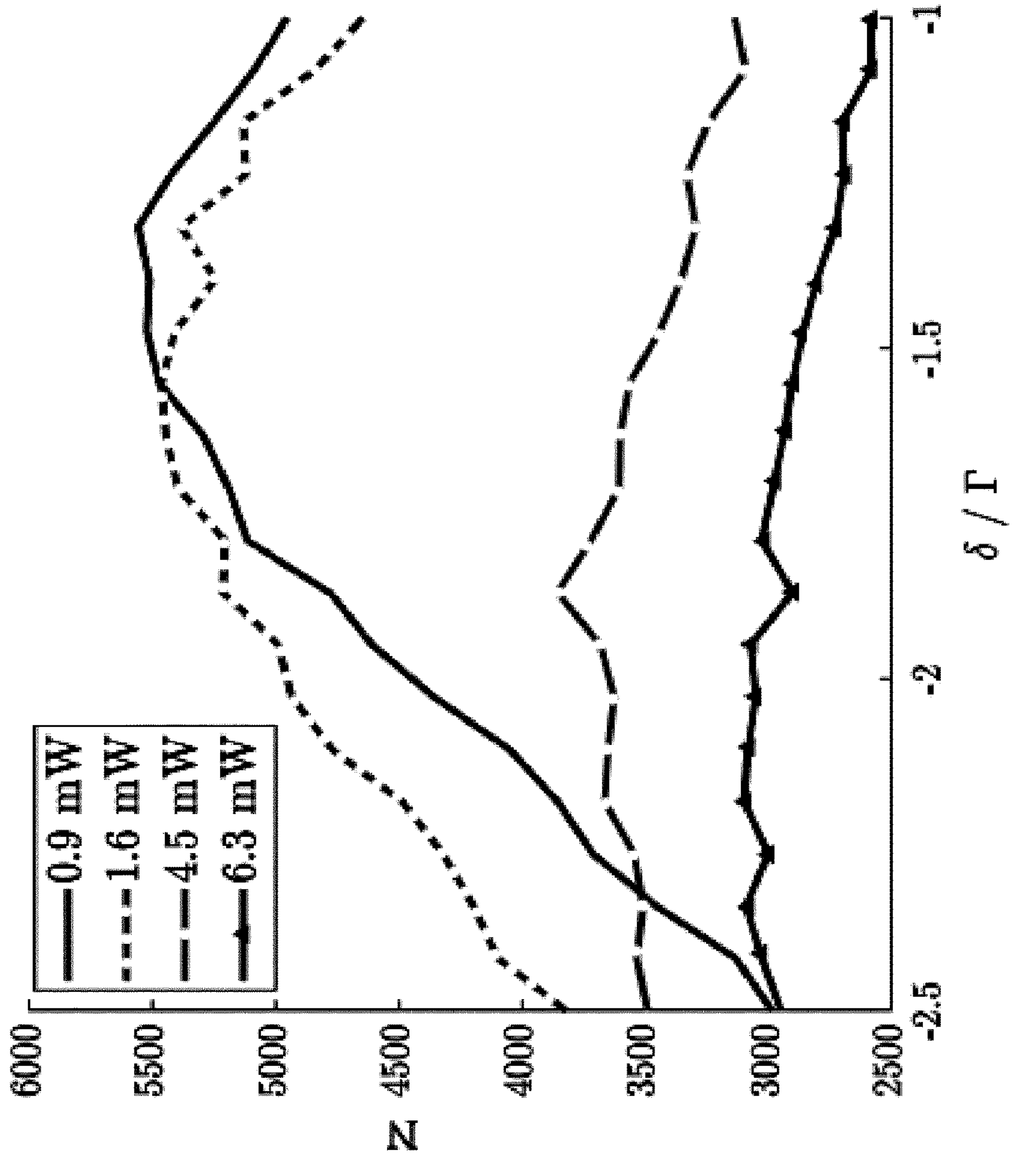
FIG. 7 is a graph showing simulation results, the graph corresponding to FIG. 5 for the experimental results.

FIG. 7 is a graph showing these simulation results in the form of a plot of atom number, N, versus red detuning, δ in units of Γ, for four different laser powers (0.9 mW, 1.6 mW, 4.5 mW and 6.3 mW), i.e. the same four values as for the experimental results shown in FIG. 5. Each dataset consists of twenty points formed from the average of six repetitions at each position. The maximum time was t=10 ms for a timestep of one microsecond, $dt=1\times10^{-6}$ s. As seen in FIG. 7 the simulation results follow the same general trends as the experimental results in that lower beam powers and lower detuning values yield higher final atom numbers.

Figure 8A:
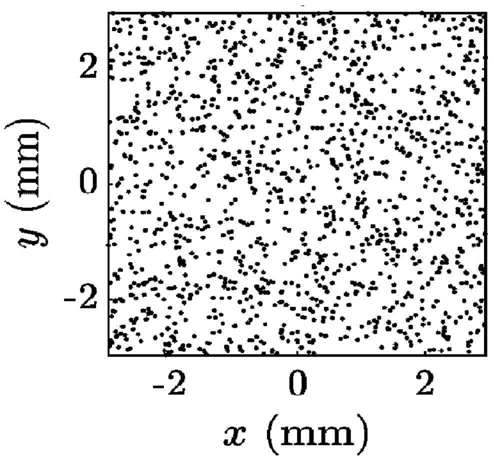
FIGS. 8A, 8B and 8C show cross-sections in the xy-plane of atom distributions as cooling and trapping proceeds, each dot representing a single atom, with the three cross-sections showing atom positions at times of t=0 ms, t=5 ms and t=10 ms during the cooling and trapping process, where t=0 is the start time.
Figure 8B:
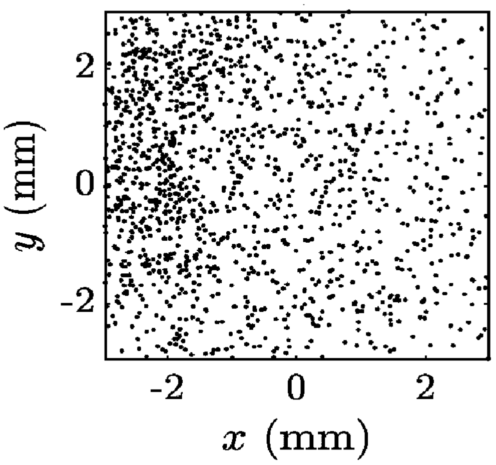
Figure 8C:
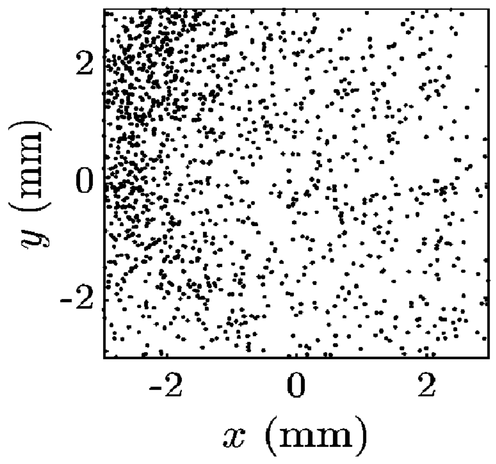

FIGS. 8A, 8B and 8C show a further aspect of the simulations in the form of 2D sections in the xy-plane of the atom distributions over time as the cooling and trapping is proceeding. The illustrated area corresponds to a cross-section of the volume of beam intersection where the cloud is expected to form, i.e. is much smaller than the vacuum cell cross-section. The simulation results are for the example of a 0.9 mW beam power and a detuning value, $\delta=-1.25\Gamma$. FIGS. 8A, 8B and 8C show the atom distributions at times t=0 ms, t=5 ms and t=10 ms respectively, where t=0 is the time when the beams are introduced into the trapping chamber. The atom distribution after cooling and trapping, i.e. at t=10 ms, as well as partway through the process at t=5 ms, are consistent with the general behaviour seen in the experimental results in that the atoms concentrate off-centre and in a non-spherical cloud.

The optical fields generated in the optical trap provide both a velocity-dependent and a position-dependent restoring force such that a dense cloud of sub-Doppler temperature atoms are formed near the trap centre. The experimental results and simulations indicate that the misalignment of the incident and retro-reflected beams is key to the efficient operation of the magnetic-field-free optical trap according to embodiments of the invention. It is now discussed why this may be the case.

Figure 9:
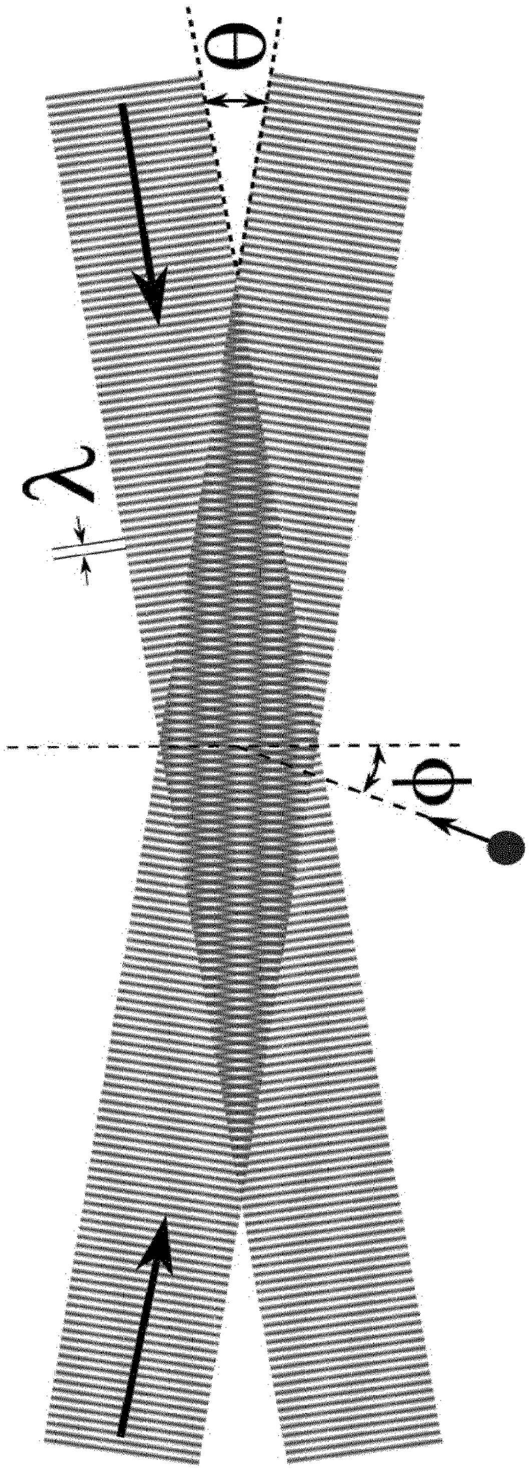
FIG. 9 is a schematic drawing of the interference between two counter-propagating beams that subtend a small angle $\theta$ to each other as in embodiments of the invention with an atom travelling at an angle $\varphi$ to the perpendicular of the angle bisecting the propagation directions of the two counter-propagating beams.

FIG. 9 is a schematic drawing of the interference between a pair of counter-propagating beams that subtend a small angle $\theta$ to each other as in the optical trap according to embodiments of the invention, i.e. $\theta$ is a proxy for any of $\alpha$, $\beta$, $\kappa$. When two counter-propagating beams are slightly misaligned in this way, a set of interference fringes are formed with the fringes extending roughly perpendicularly to the beam's wavevector, as schematically illustrated. Assuming the two counter-propagating beams are in vacuum, the fringe spacing (or "pitch") p is given by:

$$p=\lambda \cos \varphi/2 \sin \theta$$

where $\lambda$ is the wavelength of the light, $\theta$ is the angle between beams, and $\varphi$ is the angle perpendicular to the interference fringes.

While an atom passing perpendicularly through the fringe pattern, i.e. with a trajectory $\varphi=0°$, will not experience any cooling force, because any net momentum transferred to the atom does not oppose the atom's velocity, an atom passing through the fringe pattern at any other angle, i.e. with $\varphi\neq0°$, will experience a scattering force. Increasing the trajectory angle $\varphi$ will also increase the apparent fringe spacing. Assuming a beam misalignment angle of $\theta=1°$ and an atom travelling along a trajectory of $\varphi=45°$, the effective fringe spacing would increase by a factor of 20 compared with a trajectory with $\varphi=0°$. If polarization gradients are still in effect for this perpendicular standing wave, then one may expect similar increases in the capture velocity. An atom travelling through the fringes formed by the misalignment of the counter-propagating beams will thus experience polarization gradient cooling, resulting in a greater capture velocity. This could explain why such efficient cooling of large numbers of atoms is observed in the experimental results.

It is further noted that according to our understanding of the physics, formation of a cooled atom cloud will require misalignment of all three counter-propagating beam component pairs.

The experimental results showed that optical trap according to embodiments of the invention could operate under a wide parameter space, such as with variation of parameters including: beam polarization, beam power, level of red detuning, inclination angles and misalignment angles.

For the parameter space experimentally probed to date, we have found that consistently reliable formation of a dense cloud of cooled atoms is achieved over the following ranges of misalignment angles:

$\alpha\approx0°$ (but $\alpha$< >0°; see discussion below)

$1°\leq\beta\leq2°$ $0°<\kappa\leq0.5°$

While from an experimenter's point-of-view, the reflecting mirror is adjusted for retro-reflection, i.e. a is set to 0°, this must be tempered with the above understanding of the physics, so while good performance is observed when a is nominally set to 0°, it is assumed that there must nevertheless be a slight misalignment in reality (or perhaps a deviation from perfect collimation of the beam).

When altering parameters such as polarization or beam power, it was found that the following alignment procedure reliably generated a dense atom cloud:

set a first beam so that the reflected beam is nominally a retro-reflection of the incident beam ($\alpha\approx0°$), set the second beam misaligned such that the incident and reflected beam spots are separated by approximately half a beam width at the crossing point, and set the third beam to be misaligned by the same amount as, or somewhat more than, the second beam, e.g. between half and one beam width at the crossing point.

This alignment method proved to be very reliable for forming a cloud direct from vapour.

For practical convenience, in order to limit the parameter space, the systematic experiments performed to date were restricted mostly to a limited parameter space in which the number of beams (three), the beam geometry (inclination angle 30°) and polarizations (circular) were fixed and only the beam power, beam misalignment angles, red detuning level of the cooling beam and red detuning level of the repump beam were systematically varied.

Having said that, the experiments were extended to probe the parameter space more widely in the following areas:

The effect of variation of inclination angle was studied. As an initial comment it is noted that an inclination angle of 45° corresponds to a conventional optical cooling geometry with three pairs of counter-propagating beams extending along mutually orthogonal axes, i.e. a Cartesian setup. Moreover, referring to FIG. 1, it can be appreciated that the inclination angle of $\chi=30°$ is exactly equivalent to an inclination angle of $\chi=60°$, since they deviate by ±15° from orthogonal, so by changing from $\chi=30°$ to 60° all that has happened is a 90° rotation of the tripod. (In addition, with $\chi>45°$, the sign of the misalignment angles $\alpha$, $\beta$, $\kappa$ would be reversed compared to the values given elsewhere in this document.) We therefore refer to inclination angle in terms of angular deviation $\Delta\chi$ from orthogonal beams, i.e. from $\chi=45°$. With an angular deviation of $\Delta\chi=25°$ (i.e. inclination angle, $\chi$, as shown in FIG. 1 of 20°) formation of a cloud was observed, but with very poor quality in terms of cooling, density and atom number. An angular deviation of $\Delta\chi=25°$ therefore would appear to be close to the boundary of what will function. Consistently good performance was observed with angular deviations in the range $10°\leq\Delta\chi\leq20°$ (i.e. an inclination angle range as shown in FIG. 1 of $25°\leq\chi\leq35°$).

Moreover, it has been seen that the effect also occurs with linear polarization (as well as with circular polarization) of the beams.

Moreover, in principle, the inclination angle for each of the incident beam paths could be different from one another, although experiments have not systematically probed this parameter variation.

Because of the stability of the effect and the resultant large parameter space over which efficient cooling and trapping has been observed, the experiments performed to date may not yet have found the most optimal conditions in terms of atom number (highest), atom density (highest) and atom temperature (lowest) or probed the boundaries of what will work efficiently. Other combinations of the above parameters, e.g. inclination angle and misalignment angle, may also produce good or better results. It is also noted that further embodiments may use more than three beams, e.g. four beams, five beams or six beams.

It will be clear to one skilled in the art that many improvements and modifications can be made to the foregoing exemplary embodiment without departing from the scope of the present disclosure.

For those embodiments that require a repump, the repump light does not have to be introduced to co-propagate with each or every cooling beam as described above. The repump light could be added to co-propagate with only one of the cooling beams or some other subset of the cooling beams. The repump light could also be directed onto the volume of intersection along one or more beam paths that are independent of the beam paths of the cooling beams, i.e. co-propagation with a cooling beam is not required.

Moreover, as explained above, while in principal embodiments, the first, second and third alignment angles form an angle of between 25° and 35° to the reference axis, other embodiments have alignment angles beyond this range. For example, the lower limit may be as low as any one of 5°, 6°, 7°, 8°, 9°, 10°, 11°, 12°, 13°, 14°, 15°, 16°, 17°, 18° or 19°, or as already mentioned above as low as any one of 20°, 21°, 22°, 23° or 24° and as already mentioned above the upper limit may be as high as 36°, 37°, 38°, 39° or 40° to the reference axis.

In the above description, some specific preferred ranges of the misalignment angles for the cooling laser beams are stated. However, it is the case that the range of functioning misalignment angles will be a function of the beam widths and also the path lengths of the respective beams and the beam powers. For any given beam powers, there must remain a sufficient intersection of each counter-propagating beam pair within the volume of intersection. An alternative definition of preferred ranges for the misalignment angles can therefore be formulated as follows: for each counter-propagating beam pair the two beam widths and the misalignment angle between the two beams are jointly configured to ensure that in the volume of intersection at least half the beam area of the beam with the smaller beam area intersects with the beam area of the beam with the larger beam area. In the special case that both beams have the same beam area, then this definition simplifies to: for each counter-propagating beam pair the two beam widths and the misalignment angle between the two beams are jointly configured to ensure that in the volume of intersection at least half the beam areas intersect.

In the above-described embodiment a single laser has its output beam split into three components to generate the first, second and third beams for cooling. Moreover, the first, second and third beams are redirected back across the vacuum chamber by respective first, second and third reflectors. However, multiple variants of this scheme are possible. For example, the the laser source may consist of three lasers, each generating one of the first to third beams, In another variant, the reflectors could be dispensed with and the laser source could consist of six lasers, each generating one of the first to sixth beams.

Figure 10:
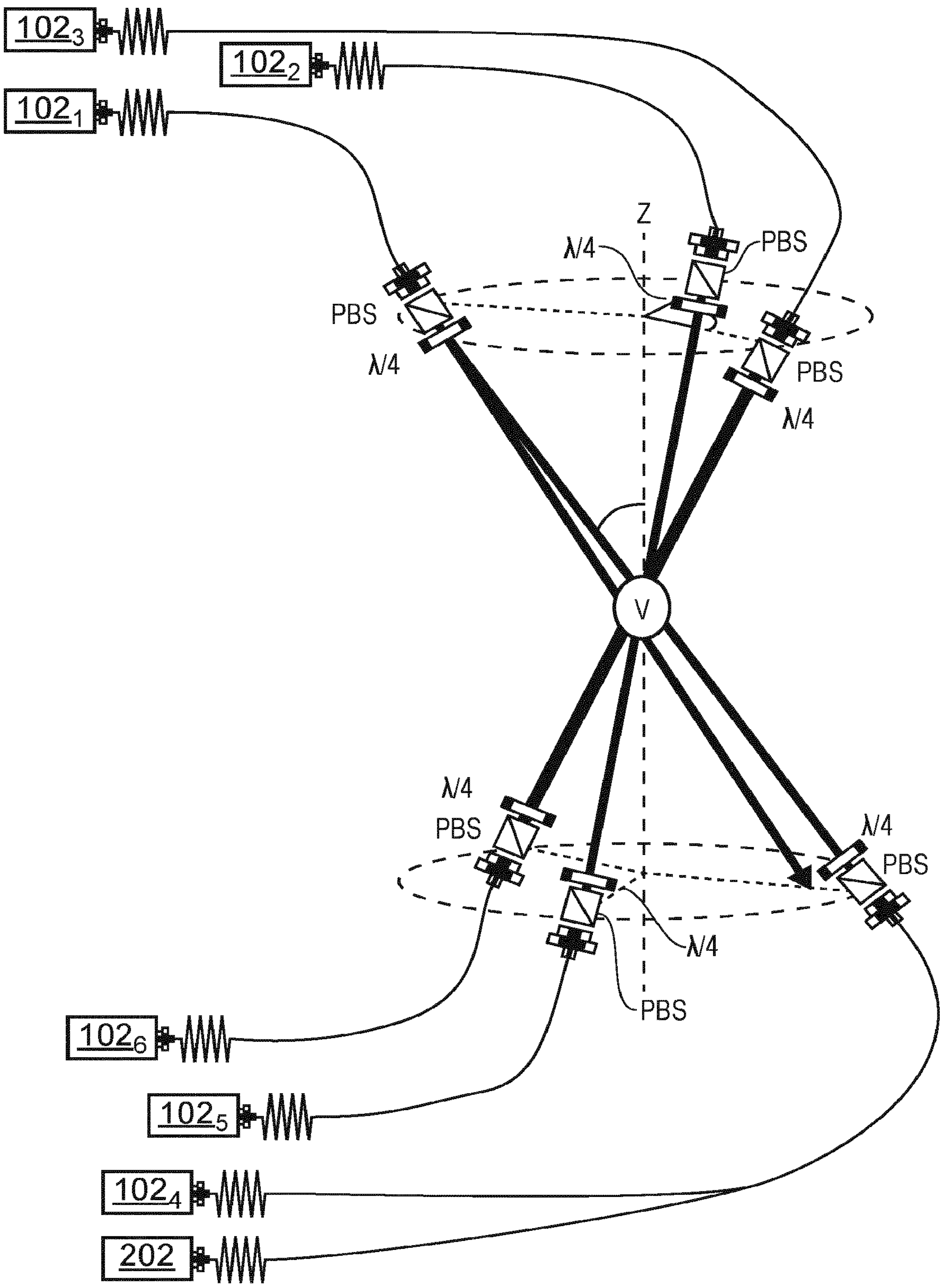
FIG. 10 is a schematic drawing of a first alternative embodiment.
Figure 11:
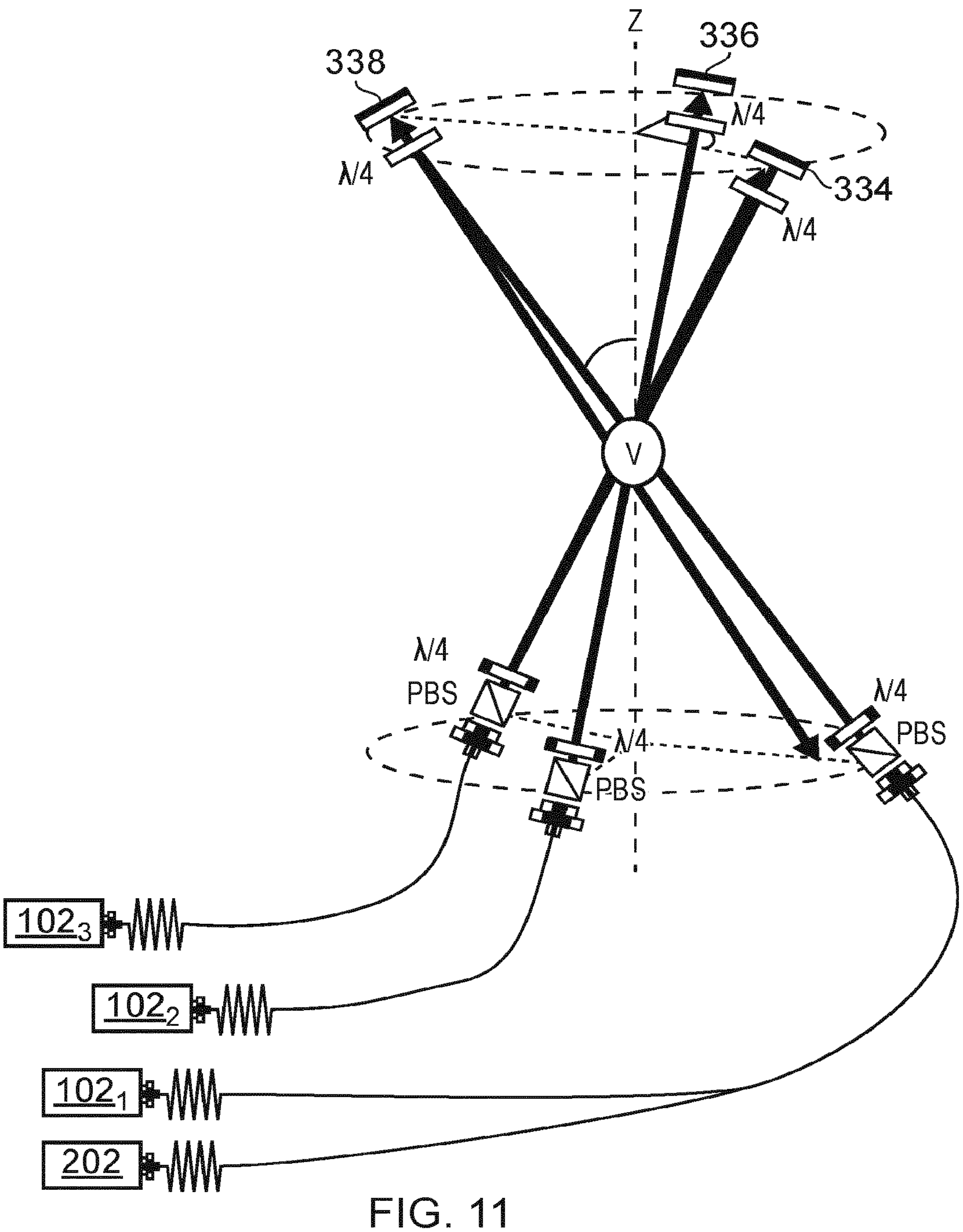
FIG. 11 is a schematic drawing of a second alternative embodiment.
Figure 12:
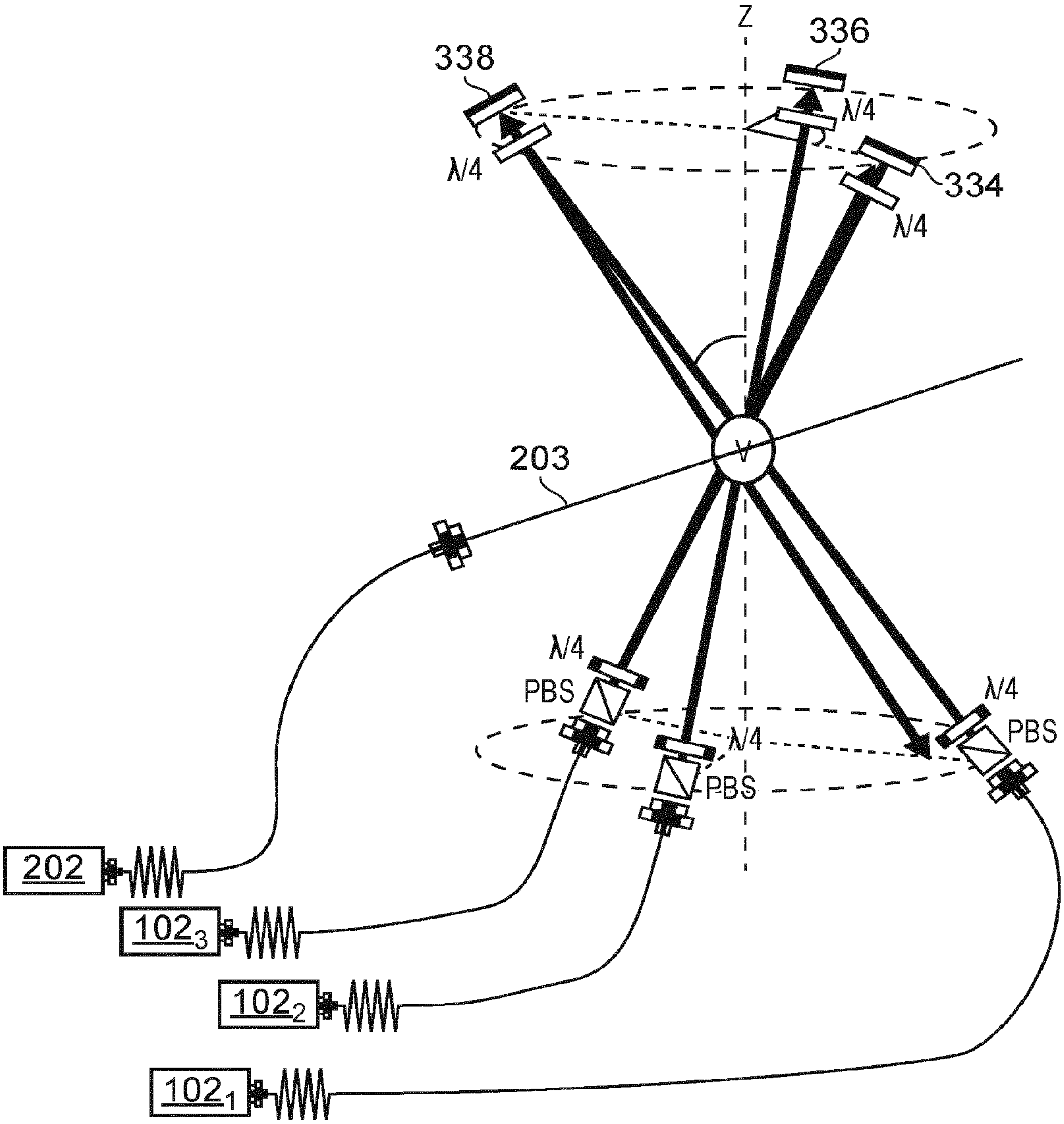
FIG. 12 is a schematic drawing of a third alternative embodiment.

FIGS. 10 to 12 are schematic drawings of alternative embodiments. The vacuum chamber and associated components are not illustrated, but will be present as shown in FIG. 4. Not all the optical components are labelled, e.g. fibres, fibre couplers etc., but these will be understood from FIG. 4.

FIG. 10 is a schematic drawing of a first alternative embodiment. In this embodiment, six cooling lasers 102_1 to 102_6 are provided to generate the first to sixth cooling beams. Moreover, an optional single repump laser 202 is shown, whose output beam is combined with one of the cooling beams, namely the output from cooling laser 102_4, e.g. using a fibre coupler as illustrated. Merging repump beams into one or more of the other cooling beams is not needed, but would be an option.

FIG. 11 is a schematic drawing of a second alternative embodiment. Three cooling lasers 102_1, 102_2, 102_3 are provided. The counter-propagating beam pairs are generated in the same way as the embodiment of FIG. 4 by respective mirrors 334, 336, 338. The repump light is provided in the same way as in FIG. 10 by merging the output from a repump laser 202 with the output from one of the cooling lasers—here cooling laser 102_1.

FIG. 12 is a schematic drawing of a third alternative embodiment. In this embodiment, the cooling beam arrangement is the same as in FIG. 11, but the repump beam is supplied by a free-space traverse of the vacuum chamber, labelled with reference numeral 203, that is geometrically independent of any of the cooling beams and can be at an arbitrary angle. All that is required is that the repump beam intersects with the volume of intersection V of the cooling beams.

Many further variants for generating and suitably directing the cooling beams, and the optional repump light, will be readily foreseeable to the skilled person.

REFERENCE NUMERALS

100 cooling laser setup
102 cooling laser, e.g. DFB @780 nm
104 optical isolator
106 half-wave plate
108 polarising beam splitter (PBS)
110 acousto-optic modulator (AOM)
112 mirror
114 mirror
116 optical fibre coupler
117 optical fibre
118 mirror
120 PBS
122 vapour cell for cooling laser stabilisation
124 PBS
126 mirror
128 half-wave plate
130 mirror
132 lens
134 photodiode (PD)
136 demodulation electronics
138 mirror
140 mirror
142 AOM
144 collimating lens
146 quarter-wave plate
148 dielectric mirror
200 repump laser setup
202 repump laser, e.g. DFB @780 nm
203 repump laser beam
204 optical isolator
206 half-wave plate
208 PBS
210 AOM

212 mirror
214 mirror
216 optical fibre coupler
217 optical fibre
218 mirror
220 PBS
222 vapour cell for repump laser stabilisation
224 PBS
226 mirror
228 half-wave plate
230 mirror
232 lens
234 quadrupole photodiode
238 mirror
240 mirror
242 AOM
300 optical trap setup
301 2-to-1 fibre coupler
302 1-to-3 fibre splitter
304 optical fibre
306 optical fibre
308 optical fibre
310 fibre coupler
312 fibre coupler
314 fibre coupler
316 PBS
318 PBS
320 PBS
322 quarter waveplate
324 quarter waveplate
326 quarter waveplate
328 quarter waveplate
330 quarter waveplate
332 quarter waveplate
334 mirror
336 mirror
338 mirror
340 ion pump
342 atom (e.g. rubidium) source
344 atom source heater
346 vacuum valve
348 vacuum conduits
350 vacuum chamber

REFERENCES

[1] P. D. Lett, R. N. Watts, C. I. Westbrook, W. D. Phillips, P. L. Gould, and H. J. Metcalf, Observation of atoms laser cooled below the doppler limit, Physical review letters 61, 169 (1988).

[2] P. J. Ungar, D. S. Weiss, E. Riis, and S. Chu, Optical molasses and multilevel atoms: theory, JOSA B 6, 2058 (1989).

[3] J. Dalibardand C. Cohen-Tannoudji, Laser cooling below the doppler limit by polarization gradients: simple theoretical models, JOSA B 6, 2023 (1989).

[4] S. Chu, M. Prentiss, A. Cable, and J. Bjorkholm, Laser cooling and trapping of atoms, in Laser Spectroscopy VIII (Springer, 1987) pp. 58-63.

[5] T. Walker, D. Sesko, and C. Wieman, Collective behavior of optically trapped neutral atoms, Physical Review Letters 64, 408 (1990).

[6] V. Bagnato, N. Bigelow, G. Surdutovich, and S. Zilio, Dynamical stabilisation: a new model for supermolasses, Optics letters 19, 1568 (1994).

[7] A. HBpe, D. Haubrich, H. Schadwinkel, F. Strauch, and D. Meschede, Optical trapping in a cesium cell with linearly polarized light and at zero magnetic field, EPL (Europhysics Letters) 28, 7 (1994).

[8] S. Sharma, B. Acharya, A. De Silva, N. Parris, B. Ramsey, K. Romans, A. Dom, V. de Jesus, and D. Fischer, All-optical atom trap as a target for motrims-like collision experiments, Physical Review A 97, 043427 (2018).

[9] A. Rauschenbeutel, H. Schadwinkel, V. Gomer, and D. Meschede, Standing light fields for cold atoms with intrinsically stable and variable time phases, Optics communications 148, 45 (1998).

[10] A. Ashkinand J. P. Gordon, Stability of radiationpressure particle traps: an optical Eamshaw theorem, Optics letters 8, 511 (1983).

[11] P. Bouyer, P. Lemonde, M. B. Dahan, A. Michaud, C. Salomon, and J. Dalibard, An atom trap relying on optical pumping, EPL (Europhysics Letters) 27, 569 (1994).

[12] R. Roy, J. Rushton, A. Dragomir, M. Aldous, and M. Himsworth, A misaligned magneto-optical trap to enable miniaturized atom chip systems, Scientific reports 8, 10095 (2018).

[13] V. Negnevitskyand L. D. Turner, Wideband laser locking to an atomic reference with modulation transfer spectroscopy, Optics express 21, 3103 (2013).

[14] M. Aldous, J. Woods, A. Dragomir, R. Roy, and M. Himsworth, Carrier frequency modulation of an acousto-optic modulator for laser stabilisation, Optics Express 25, 12830 (2017).

[15] C. Gabbanini, A. Evangelista, S. Gozzini, A. Lucchesini, A. Fioretti, J. Müller, M. Colla, and E. Arimondo, Scaling laws in magneto-optical traps, EPL (Europhysics Letters) 37, 251 (1997).

[16] G. Gattobigio, T. Pohl, G. Labeyrie, and R. Kaiser, Scaling laws for large magneto-optical traps, Physica Scripta 81, 025301 (2010).

[17] G. W. Hoth, E. A. Donley, and J. Kitching, Atom number in magneto-optic traps with millimeter scale laser beams, Optics letters 38, 661 (2013).

[18] V. Letokhovand V. Minogin, Cooling, trapping, and storage of atoms by resonant laser fields, JOSA 69, 413 (1979).

The invention claimed is:

1. An optical trap for trapping and cooling atoms, the optical trap comprising:

a vacuum chamber operable to provide a vacuum atmosphere in which atoms of an atomic species can be laser cooled via excitation of an electronic transition of the atomic species, referred to as the cooling transition;

a laser source configured to generate laser light at a frequency detuned below the frequency of the cooling transition;

an optical arrangement configured to manipulate the laser light to generate first, second and third beams with respective first, second and third beam widths, and to direct the first, second and third beams to propagate across the vacuum chamber along respective first, second and third incident beam paths that deviate from a mutually orthogonal arrangement in which they would each form an alignment angle of 45° to a reference axis, having instead respective first, second and third alignment angles of between 20° and 40° to the reference axis; and first, second and third reflectors arranged to reflect the first, second and third beams to propagate back across the vacuum chamber along their incident beam paths in respective first, second and third reflected beam paths that deviate from a retro-reflection, in which each reflected beam path would be coincident with its incident beam path, by respective first, second and third misalignment angles, the first, second and third misalignment angles and beam widths having values that define a volume of intersection within the vacuum chamber traversed by the first, second and third beams both when propagating along their incident beam paths and their reflected beam paths.

2. The optical trap of claim 1, wherein the misalignment angles comply with one or more of the following conditions:

each of the misalignment angles is greater than 0.1°;

each of the misalignment angles is less than 2°;

at least one of the misalignment angles is greater than 0.5°; and at least two of the misalignment angles are greater than 0.5°.

3. The optical trap of claim 1, wherein the first, second and third reflectors are configured such that the reference axis and each pair of incident and reflected beam paths lie at least approximately in a common plane, thereby defining first, second and third such planes.

4. The optical trap of claim 3, wherein the first, second and third planes are approximately equally angularly spaced as viewed along the reference axis.

5. The optical trap of claim 1, further comprising polarising components arranged to provide the first, second and third beams with respective defined polarisation states when they enter the vacuum chamber.

6. The optical trap of claim 5, wherein the first, second and third reflectors are configured to ensure that the defined polarisation states of the first, second and third beams are preserved on reflection.

7. The optical trap of claim 1, wherein the atomic species has a further electronic transition, referred to as the repump transition, which is required to be excited for efficient cooling to occur, and wherein the laser source or a further laser source is configured to generate further laser light at a further frequency tuned at the frequency of the repump transition.

8. The optical trap of claim 7, the optical arrangement further comprising a beam combiner operable to combine the laser light and the further laser light so that each of the first, second and third beams contain both the laser light and the further laser light.

9. The optical trap of claim 1, wherein the first, second and third beams are at least approximately collimated as they cross the vacuum chamber.

10. The optical trap of claim 1, wherein the optical trap does not include a magnetic field generator.

11. The optical trap of claim 1, wherein the first, second and third alignment angles are between 25° and 35°.

12. The optical trap of claim 1, wherein the first, second and third beams are equally spaced radially about the reference axis.

13. A method of laser cooling and trapping atoms, the method comprising:

providing a vacuum chamber containing atoms of an atomic species to be laser cooled in a vacuum atmosphere via excitation of an electronic transition of the atomic species, referred to as the cooling transition;

providing laser light at a frequency detuned below the frequency of the cooling transition;

providing first, second and third beams of the laser light with respective first, second and third beam widths;

directing the first, second and third beams to propagate across the vacuum chamber along respective first, second and third incident beam paths that deviate from a mutually orthogonal arrangement in which they would each form an alignment angle of 45° to a reference axis, having instead respective first, second and third alignment angles of between 25° and 35° to the reference axis;

reflecting the first, second and third beams to propagate back across the vacuum chamber along their incident beam paths in respective first, second and third reflected beam paths that deviate from a retro-reflection, in which each reflected beam path would be coincident with its incident beam path, by respective first, second and third misalignment angles, the first, second and third misalignment angles and beam widths having values that define a volume of intersection within the vacuum chamber traversed by the first, second and third beams both when propagating along their incident beam paths and their reflected beam paths.

14. The method of claim 13, wherein the atomic species has a further electronic transition, referred to as the repump transition, which is required to be excited for efficient cooling to occur, and wherein the method further comprises:

providing further laser light at a further frequency tuned at the frequency of the repump transition, wherein the first, second and third beams include the further laser light.

15. The method of claim 13, wherein the first, second and third beams which are at least approximately collimated.

16. The method of claim 13, wherein the laser cooling takes place without a magnetic field being present.

17. The method of claim 13, wherein the misalignment angles comply with one or more of the following conditions:

each of the misalignment angles is greater than 0.1°;

each of the misalignment angles is less than 2°;

at least one of the misalignment angles is greater than 0.5°; and at least two of the misalignment angles are greater than 0.5°.

18. The method of claim 13, wherein the reference axis and each pair of incident and reflected beam paths lie at least approximately in a common plane, thereby defining first, second and third such planes.

19. The method of claim 18, wherein the first, second and third planes are approximately equally angularly spaced as viewed along the reference axis.

* * * * *